(12) United States Patent
Matsui

(10) Patent No.: US 10,359,753 B2
(45) Date of Patent: Jul. 23, 2019

(54) PROGRAM REWRITING SYSTEM AND PROGRAM REWRITING METHOD

(71) Applicant: Mitsubishi Electric Corporation, Tokyo (JP)

(72) Inventor: Toshinori Matsui, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 359 days.

(21) Appl. No.: 15/218,475

(22) Filed: Jul. 25, 2016

(65) Prior Publication Data
US 2017/0108842 A1 Apr. 20, 2017

(30) Foreign Application Priority Data

Oct. 15, 2015 (JP) ................. 2015-203460

(51) Int. Cl.
  *G05B 11/01* (2006.01)
  *G05B 19/042* (2006.01)
(52) U.S. Cl.
  CPC .......... *G05B 19/0426* (2013.01); *G05B 11/01* (2013.01); *G05B 2219/23229* (2013.01)
(58) Field of Classification Search
  None
  See application file for complete search history.

(56) References Cited

U.S. PATENT DOCUMENTS

| 2004/0068548 | A1* | 4/2004 | Sugita | G06F 8/65 |
| | | | | 709/208 |
| 2004/0143828 | A1* | 7/2004 | Liu | G06F 8/654 |
| | | | | 717/168 |
| 2006/0085564 | A1* | 4/2006 | Bomhoff | G06F 8/65 |
| | | | | 710/8 |
| 2008/0256526 | A1* | 10/2008 | Ellsworth | G06F 11/1433 |
| | | | | 717/168 |
| 2009/0172814 | A1* | 7/2009 | Khosravi | G06F 21/51 |
| | | | | 726/23 |
| 2011/0173604 | A1* | 7/2011 | Nakamura | G06F 8/63 |
| | | | | 717/173 |
| 2014/0075173 | A1* | 3/2014 | Bower | H04L 67/34 |
| | | | | 713/2 |

FOREIGN PATENT DOCUMENTS

| JP | 4668656 B2 | 4/2011 |
| JP | 5323151 B2 | 10/2013 |

* cited by examiner

*Primary Examiner* — Thomas C Lee
*Assistant Examiner* — Gary Collins
(74) *Attorney, Agent, or Firm* — Sughrue Mion, PLLC; Richard C. Turner

(57) ABSTRACT

Each of a plurality of type 2 nodes stores one of divisional programs, which are created as parts of a rewriting program for rewriting a program for determining the operation of a type 1 node, by dividing the rewriting program in a manner that allows a partial overlap in data between a divisional program stored in the type 2 node and a divisional program stored in another type 2 node. When divisional programs to the type 1 node are transmittable, each type 2 node transmits the divisional program stored in its own node to the type 1 node via a first network. The type 1 node rewrites a part that corresponds to the received divisional program, and uses the overlapping data to verify whether or not the divisional programs rewritten are the same.

21 Claims, 17 Drawing Sheets

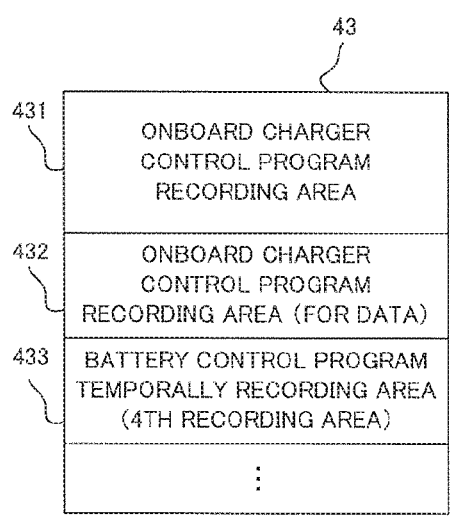
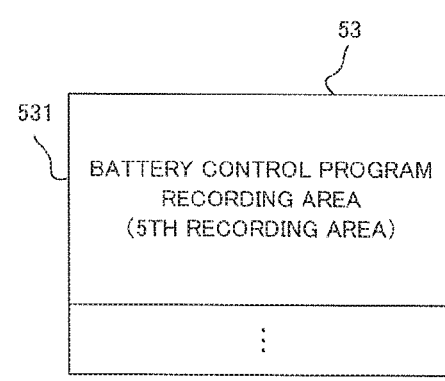
FIG. 7A                    FIG. 7B

PROGRAM REWRITING SYSTEM AND PROGRAM REWRITING METHOD

BACKGROUND OF THE INVENTION

1. Field of the Invention

The present invention relates to a program rewriting system and a program rewriting method, and more particularly, to a rewriting system and a rewriting method for rewriting a program in nodes that are a plurality of control units connected to a network.

2. Description of the Related Art

Hitherto, as a program rewriting system and method (hereinafter occasionally referred to collectively as "system") for control units connected to a network, those proposed in Japanese Patent No. 4668656, for example, have been known.

The program rewriting system of Japanese Patent No. 4668656 is described with reference to FIG. 16A and FIG. 16B. As illustrated in FIG. 16A, a first control unit 16 which has an interface function to provide an interface with the outside and executes rewriting, an overall control unit 17, a second control unit 18 with program data to be rewritten, and a plurality of third control units 19 are connected to a vehicle network 8.

The overall control unit 17 is connected to the first control unit 16, which has an interface function to provide an interface with the outside, via a gateway 17a, which has a given function. The overall control unit 17 includes storage media 17b capable of storing or saving given data and a CPU 17c for exerting overall control. The second control unit 18 with the program data to be rewritten includes storage media 18a for storing given data, a CPU 18b capable of optimum control with a given input signal, and a memory 18c.

As illustrated in FIG. 16B, the first control unit 16 includes a data input part 16a, a storage device 16e for temporarily storing data from the data input part 16a, a CPU 16d for exerting overall control on the first control unit 16, a data output part 16c, which serves as an input/output interface with the gateway 17a, and a second interface part 16b for outputting to an output part, e.g., a display part.

When rewriting the program data of the second control unit 18 is executed in Japanese Patent No. 4668656, program rewriting data is input to the first control unit 16 from the data input part 16a. This data is output to the gateway 17a via the data output part 16c under control of the CPU 16d. The data is then sent via the gateway 17a to the overall control unit 17 to be accumulated temporarily in the storing media 17b. The program rewriting data is further transmitted to the storing media 18a of the second control unit 18 over the vehicle network 8 when a rewriting execution condition such as a voltage range and a temperature range is fulfilled.

The program rewriting system proposed in Japanese Patent No. 4668656 requires the overall control unit 17, which is one communication node, to have therein the storing media 17b, which has a capacity necessary to record all pieces of program rewriting data. A resultant problem is increased costs.

In order to solve this problem, the applicant of this patent application has proposed a program rewriting system and a program rewriting method described in Japanese Patent No. 5323151. In Japanese Patent No. 5323151, divisional or divided programs each of which is a part of a rewriting program are stored in type 2 nodes of a plurality of motor control units or the like, and each of the type 2 nodes transmits the divisional program that is stored thereon to a type 1 node of a battery control unit or the like. Each time a divisional program is received from one of the type 2 nodes, the type 1 node rewrites a part of a program for determining the operation of the type 1 node that corresponds to the received divisional program.

However, Japanese Patent No. 5323151 has a problem in that program rewriting data cannot be verified in the case where the program is damaged by a disturbance or the like after the rewriting data is recorded in a type 2 node.

SUMMARY OF THE INVENTION

The present invention has been made to solve the problems described above, and an object of the present invention is therefore to provide a program rewriting system and a program rewriting method with which a program of a control unit connected to a network can be rewritten efficiently, a situation in which the cost of one node is exceedingly higher than the cost of other nodes is avoided, and whether or not a program used to rewrite is correct can be verified.

For achieving the above object, the present invention provides a program rewriting system, comprising a type 1 node and a plurality of type 2 nodes which are communicably connected with each other via a first network, for rewriting a program which determines operations of the type 1 node, wherein the type 1 node comprises: a first recording area for storing the program; a program rewriting part for partially rewriting the program stored in the first recording area; and a program verification part for verifying whether or not the rewritten programs are identical, wherein each of the type 2 nodes comprises: a second recording area for storing a divisional program, that is a part of a rewriting program for the program as to include contents partially overlapped with the divisional program stored in another of the type 2 nodes; and a transmittability determining part for determining whether or not the divisional program to the type 1 node is transmittable, wherein each of the type 2 nodes transmits the divisional program stored in the type 2 node itself to the type 1 node via the first network when the transmittability determining part determines that the divisional program to the type 1 node is transmittable, and wherein each time the divisional program is received from one of the type 2 nodes, the program rewriting part of the type 1 node rewrites a part of the program, stored in the first recording area, corresponding to the received divisional program, and the program verification part of the type 1 node verifies with the contents overlapped whether or not the rewritten divisional programs are mutually identical.

Also, for achieving the above object, the present invention provides a program rewriting method for rewriting a program for determining operation of a type 1 node in a system comprising the type 1 node and a plurality of type 2 nodes, which are communicably connected with each other via a first network, the program rewriting method comprising: storing, by each of the type 2 nodes, a divisional program, that is a part of a rewriting program for rewriting the program so as to include contents partially overlapped with a divisional program stored in another of the type 2 nodes; transmitting, by each of the type 2 nodes, via the first network, the divisional program stored in the type 2 node itself to the type 1 node when the each of the type 2 nodes determines that the divisional program to the type 1 node is transmittable; and rewriting, by the type 1 node, each time the divisional program is received from one of the type 2 nodes, a part of the program which corresponds to the received divisional program, and verifies whether or not the divisional programs rewritten are same.

According to the program rewriting system and method of the present invention, each type 2 node stores a divisional program, which is a part of a rewriting program for a program which determines operations of the type 1 node, so as to include contents partially overlapped with the divisional program stored in another type 2 node and, when determining that the divisional program to the type 1 node is transmittable, transmits the divisional program stored in its own node to the type 1 node via the first network, and the type 1 node rewrites parts of the operation determining program that correspond to the received divisional programs and, based on the overlapped contents, determines whether or not the divisional programs rewritten are the same. The program rewriting system and method are therefore capable of efficient program rewriting and verification after the rewriting. In addition, there is no need to give the type 2 node a recording capacity large enough to store the entire rewriting program, thereby preventing the cost of one node from becoming exceedingly higher, and the overall cost is kept low as a result.

BRIEF DESCRIPTION OF THE DRAWINGS

FIG. 7A and FIG. 7B are memory map charts for illustrating the recording area configurations of recording media in a type 4 node and a type 5 node of the program rewriting system according to the second embodiment of the present invention, respectively;

DETAILED DESCRIPTION OF THE EMBODIMENTS

Program rewriting systems and methods according to first to third embodiments of the present invention will be described below with reference to the drawings. Throughout the accompanying drawings, identical or equivalent components are denoted by the same reference symbols or numbers.

First Embodiment

Figure 1:
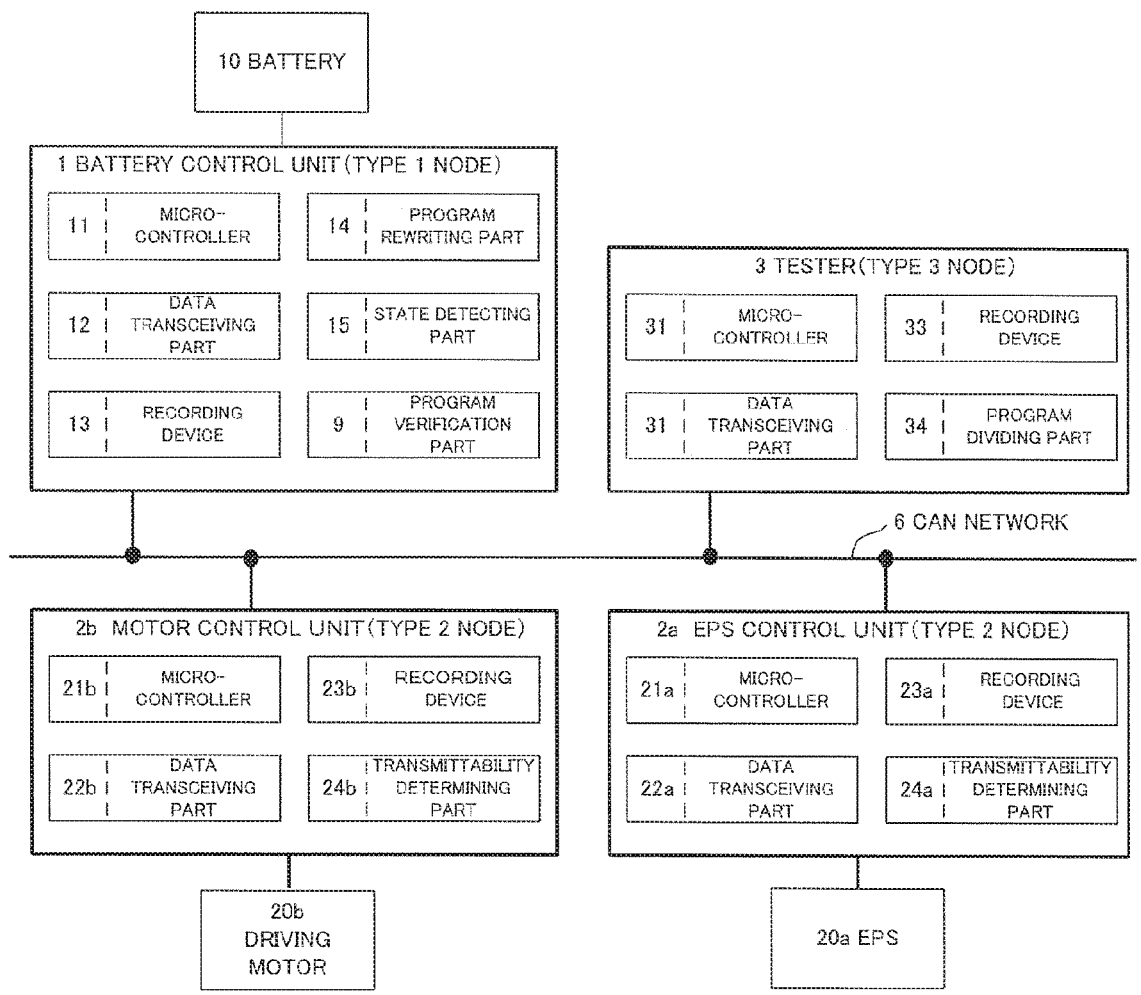
FIG. 1 is a block diagram for illustrating the configuration of a vehicle control system to which a program rewriting system according to a first embodiment of the present invention is applied.

FIG. 1 is a diagram for illustrating the configuration of a vehicle control system to which a program rewriting system and method of the first embodiment are applied. Components of control units and a tester that are not directly relevant to the first embodiment are omitted from FIG. 1.

FIG. 2A to FIG. 2D are diagrams for illustrating the recording area configurations of recording media 13, 23a, 23b, and 33, which are respectively included in a type 1 node, type 2 nodes, and a type 3 node in the vehicle control system of FIG. 1.

The program rewriting system according to the first embodiment includes a battery control unit 1, which is a type 1 node, an electric power steering (EPS) control unit 2a and a motor control unit 2b, which are type 2 nodes, and a tester 3, which is a type 3 node.

The nodes are communicably connected with each other via a controller area network (CAN) network 6 of a vehicle, which is a first network. While the type 2 nodes discussed here are the EPS control unit 2a and the motor control unit 2b, the program rewriting system can further include other type 2 nodes.

The battery control unit 1 as a type 1 node controls a battery 10. Similarly, the EPS control unit 2a and the motor control unit 2b are connected so as to control an EPS 20a and a driving motor 20b, respectively. The other control units of FIG. 1 other than the tester 3 shown in FIG. 1 are connected to the CAN network 6 all the time, whereas the tester 3 is connected to the CAN network 6 when necessary, in such a case where a program is rewritten or the nodes are tested for failure diagnosis.

The configuration and functions of the battery control unit 1 will be described briefly. A microcontroller 11 computes a control amount related to the control of the battery 10 and various processing values. A data transceiving (i.e. transmitting/receiving) part 12, which is a data transceiving part for the CAN network, transmits/receives data to/from other control units connected to the CAN network 6 (including the EPS control unit 2a, the motor control unit 2b, and the tester 3) over the CAN network 6.

The recording device 13 has a first recording area to store a battery control program, which is a program to be rewritten. The battery control program determines the operation of the battery control unit 1 (the contents of control), and performs computing.

Figure 2A:
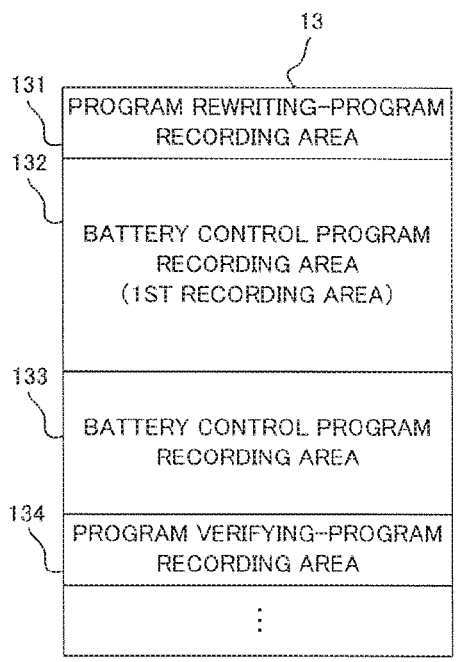
FIG. 2A, FIGS. 2B and 2C, and FIG. 2D are memory map charts for illustrating the recording area configurations of recording media in a type 1 node, a type 2 node, and a type 3 node of the program rewriting system according to the first embodiment of the present invention, respectively.

The recording area configuration of the recording device 13 will be described with reference to FIG. 2A. The recording device 13 includes a program rewriting program recording area 131 in which a program rewriting program for partially rewriting the battery control program is stored, a battery control program recording area 132, which is the first recording area for storing the battery control program, a battery control program recording area (for data) 133 in which data and the like related to the control of the battery 10 are stored, and a program verification-program recording area 134 in which a program verification program for performing partial verification on the battery control program is stored.

A program rewriting part 14 of the battery control unit 1 partially rewrites the battery control program stored in the battery control program recording area 132 of the recording device 13. The partial rewriting uses the program rewriting program, which is recorded in the program rewriting program recording area 131 of the recording device 13.

A state detecting part 15, which is a first state detecting part, detects a state with respect to, for example, whether or not the type 1 node itself is in a state where the battery control program can be rewritten, or whether or not all parts of the battery control program have been rewritten. In the case where the state detecting part 15 detects that the battery control unit 1 is capable of rewriting the battery control program, the EPS control unit 2a and the motor control unit 2b are notified over the CAN network 6 and, in response to the notification, transmit divisional programs stored in their own nodes to the battery control unit 1 over the CAN network 6.

A program verification part 9 of the battery control unit 1 performs verification on the battery control program stored in the battery control program recording area 132 of the recording device 13. In the verification, the program verification part 9 uses the program verification program, which is recorded in the program verification program recording area 134 of the recording device 13, to check divisional programs for breakage (for example, bit inversion due to noise) during transmission over the CAN network 6 or during storage on other nodes, and for other troubles.

Each time a divisional program is received from the EPS control unit 2a or the motor control unit 2b, the battery control unit 1 uses the program rewriting part 14 to execute rewriting for a part of the battery control program stored in the battery control program recording area 132 that corresponds to the received divisional program and that has not been rewritten, and uses the program verification part 9 to perform verification on the contents rewritten for a part of the battery control program that corresponds to the received divisional program and that has been rewritten.

The configuration and functions of the EPS control unit 2a as a type 2 node will be described next briefly. A microcontroller 21a computes a control amount and various processing values of the EPS 20a. A data transceiving part 22a transmits/receives data to/from other control units connected to the CAN network 6 (including the battery control unit 1, the motor control unit 2b, and the tester 3) over the CAN network 6. The recording device 23a has a second recording area to store a divisional battery control program (hereinafter abbreviated as "divisional program"), which is a part of a rewriting program for rewriting the battery control program.

Figure 2B:
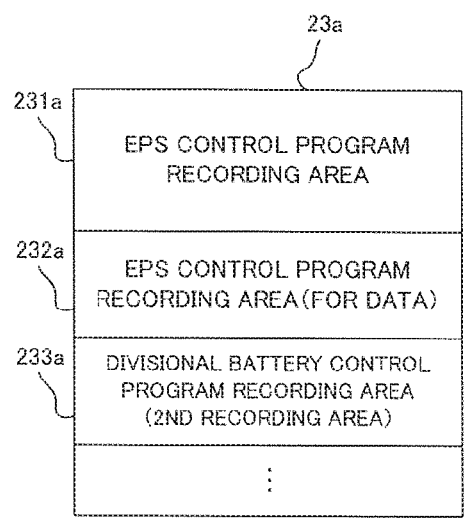

The recording area configuration of the recording device 23a will be described with reference to FIG. 2B. The recording device 23a includes an EPS control program recording area 231a in which an EPS control program for determining the contents of control performed on the EPS 20a is stored, an EPS control program recording area (for data) 232a in which data and the like related to the control of the EPS 20a are stored, and a divisional battery control program recording area 233a, which is the second recording area for storing a divisional program temporarily. A free area or the like of the recording device 23a can be allocated as the divisional battery control program recording area 233a.

A transmittability (i.e. transmission executability) determining part 24a determines whether or not divisional programs can be transmitted to the battery control unit 1. When the transmittability determining part 24a determines that divisional programs can be transmitted to the battery control unit 1, the EPS control unit 2a transmits the divisional program stored in itself to the battery control unit 1 over the CAN network 6.

The configuration and functions of the motor control unit 2b, which is a type 2 node as well, will be described next briefly. A microcontroller 21b computes a control amount and various processing values of the driving motor 20b. A data transceiving part 22b transmits/receives data to/from other control units (including the battery control unit 1, the EPS control unit 2a, and the tester 3) connected to the CAN network 6. The recording device 23b has another second recording area to store a divisional program, which is a divided part of the rewriting program for rewriting the battery control program.

Figure 2C:
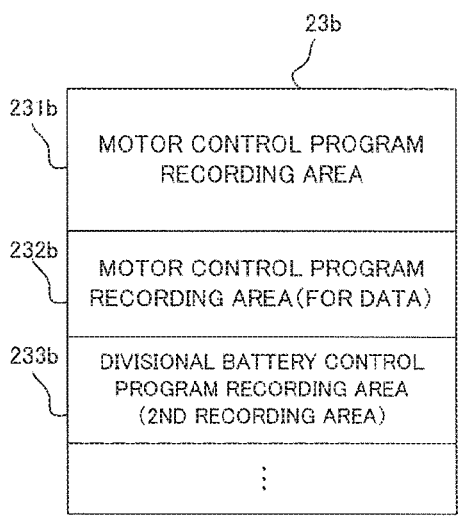

The recording area configuration of the recording device 23b will be described with reference to FIG. 2C. The recording device 23b includes a motor control program recording area 231b in which a motor control program for determining the contents of control performed on the driving motor 20b is stored, a motor control program recording area (for data) 232b in which data and the like related to the control of the driving motor 20b are recorded, and a divisional battery control program recording area 233b, which is the second recording area for temporarily storing a divisional program. A free area or the like of the recording device 23b can be allocated as the divisional battery control program recording area 233b.

A transmittability determining part 24b determines whether or not divisional programs can be transmitted to the battery control unit 1. When the transmittability determining part 24b determines that divisional programs can be transmitted to the battery control unit 1, the motor control unit 2b transmits the divisional program stored in itself to the battery control unit 1 over the CAN network 6.

Figure 2D:
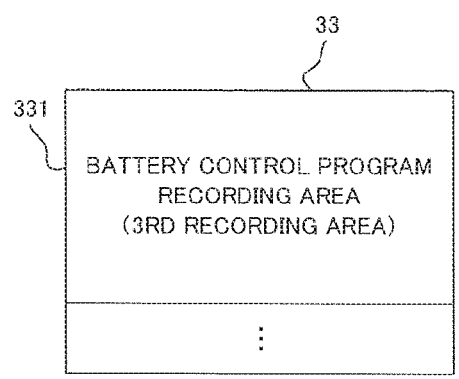

The configuration and functions of the tester 3 as a type 3 node will be described next briefly. A microcontroller 31 executes various types of processing related to the operation of the tester 3. A data transceiving part 32 transmits/receives data to/from other control units connected to the CAN network 6 (including the battery control unit 1, the EPS control unit 2a, and the motor control unit 2b) over the CAN network 6. As illustrated in FIG. 2D, the recording device 33 has a battery control program recording area 331, which is a third recording area where the rewriting program for rewriting the battery control program is stored.

A program dividing part 34, which is a first program dividing part, divides the rewriting program stored in the battery control program recording area 331 of the recording device 33 into divisional programs that partially overlap with one another in data.

Figure 17:
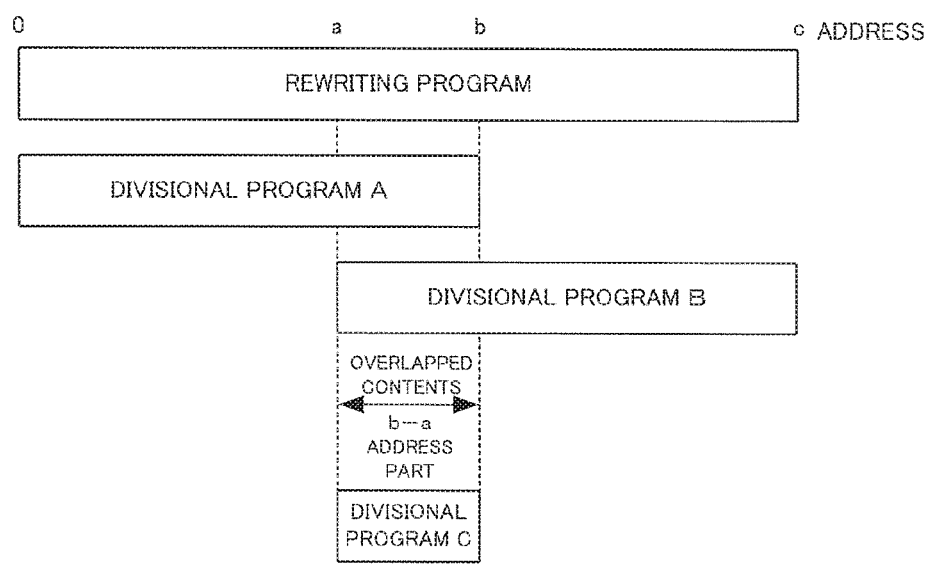
FIG. 17 is a diagram for illustrating the configuration of divisional programs that are used in the program rewriting systems according to the embodiments of the present invention.

The configuration of the rewriting program and the divisional programs will be described with reference to FIG. 17. The rewriting program in FIG. 17 is made up of codes having an address 0 to an address c. This rewriting program is divided into a divisional program A, which includes codes having the address 0 to the address b, and a divisional program B, which includes codes having the address a to the address c (the addresses satisfy a relation c>b>a>0). The divisional program A and the divisional program B thus include the same data from the address a to the address b. This manner of division is an example, and the rewriting program can be divided in other ways as long as divisional programs created partially overlap with one another in data, for example, important parts. The overlapping part of the divisional programs is a divisional program C as illustrated in FIG. 17.

The divisional programs created by the program dividing part 34 are transmitted separately to the EPS control unit 2a and the motor control unit 2b over the CAN network 6.

The flows of processing procedures that are executed at the respective nodes in the program rewriting system according to the first embodiment will be described next with reference to flow charts of FIG. 3, FIG. 4A, and FIG. 4B.

Figure 3:
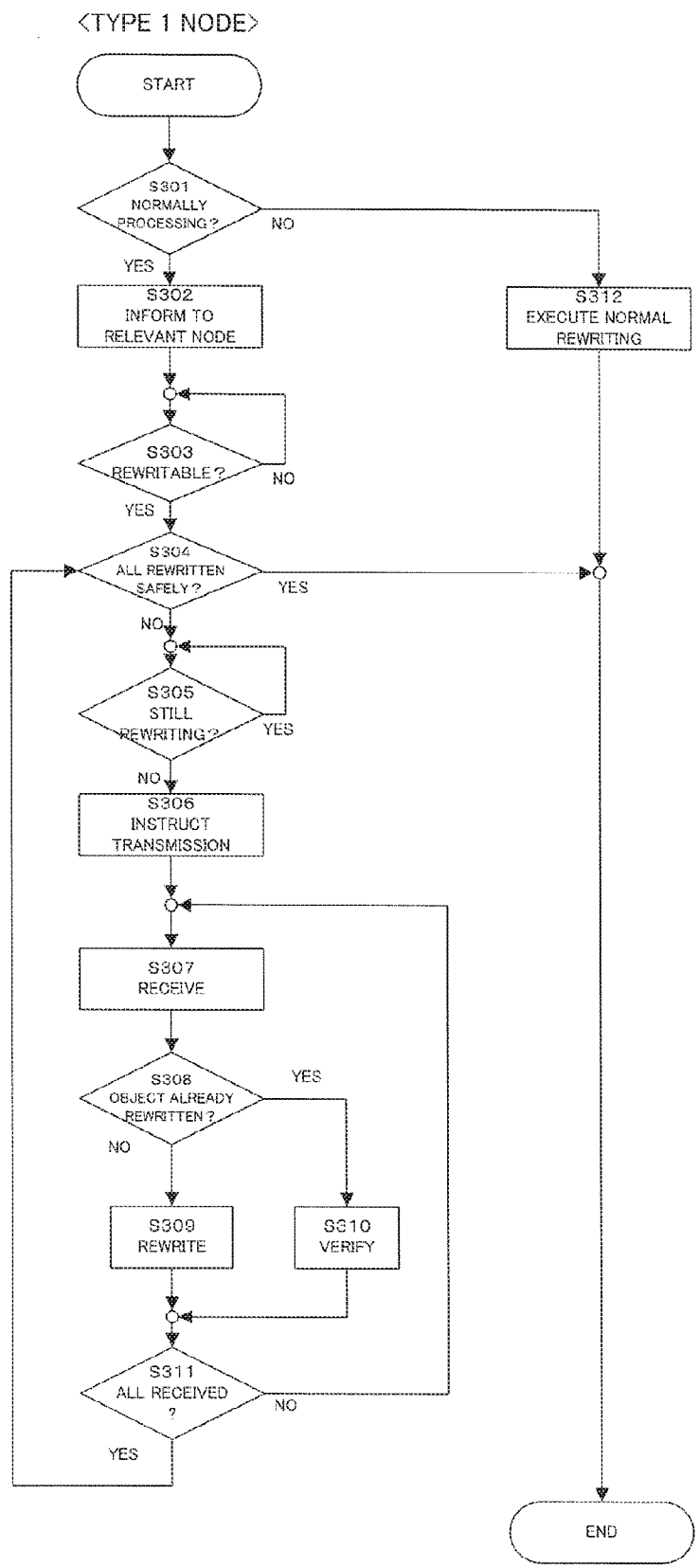
FIG. 3 is a diagram for illustrating the flow of processing at the type 1 node of the program rewriting system according to the first embodiment of the present invention.
Figure 4A:
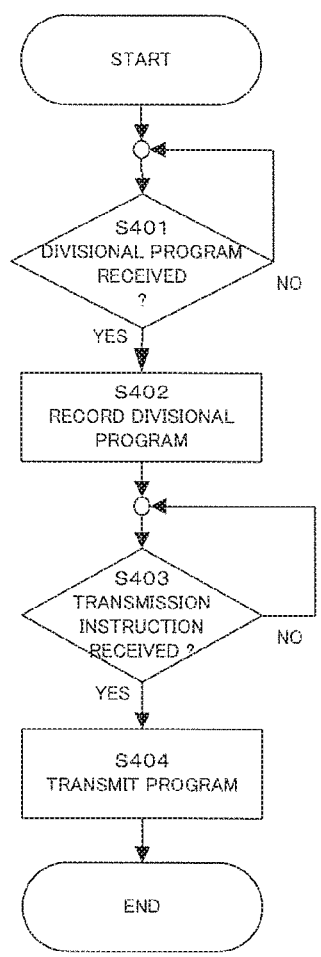
FIG. 4A and FIG. 4B are diagrams for illustrating the flows of processing procedures at the type 2 node and the type 3 node, respectively, in the program rewriting system according to the first embodiment of the present invention.
Figure 4B:
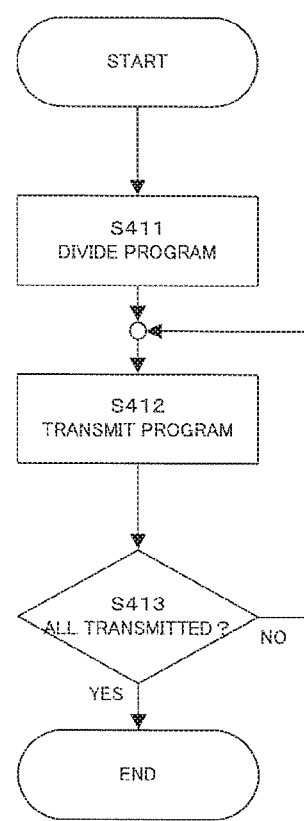

FIG. 3 is a flow chart for illustrating the flow of processing that is related to program rewriting in the battery control unit 1, which is a type 1 node. The battery control unit 1 executes normal processing related to the control of the battery 10 and processing related to the rewriting of the battery control program. The processing related to program rewriting is executed when a rewrite execution notification (i.e. rewriting instructions) is received from the tester 3. The flow illustrated in FIG. 3 is particularly a processing flow after the reception of a rewrite execution notification from the tester 3.

In Step S301, the state detecting part 15 first determines whether or not the battery control unit 1 is executing the normal processing related to the control of the battery 10. In the case where the normal processing is being executed (YES), the processing related to program rewriting proceeds to Step S302 and, in the case where the normal processing is not being executed (NO), proceeds to Step S312 to execute normal rewriting. The normal rewriting in Step S312 is a conventional rewriting method to rewrite a battery control program of battery control unit 1 from the tester 3, not by dividing a rewriting program which is a feature of the present invention. A description on the normal rewriting is therefore omitted.

In the case where the battery control unit 1 is executing the normal processing related to the control of the battery 10, the battery control program cannot be rewritten for the duration. Accordingly, executing divisional rewriting is notified to a relevant node in Step S302, and the processing related to program rewriting proceeds to Step S303. In Step S303, the state detecting part 15 again determines whether the normal processing is being executed. In the case where the normal processing is not being executed, the rewriting is executable (YES) and the processing related to program rewriting therefore proceeds to Step S304. In the case where the normal processing is being executed, the state detecting part 15 stands by until the normal processing is finished.

In Step S304, the state detecting part 15 determines whether or not a problem has been found in the verification, and whether or not all areas (parts) of the battery control program stored in the battery control program recording area 132 of the recording device 13 have been rewritten. In the case where a problem has been found in the verification or all parts have been rewritten without finding a problem in the verification (YES), the processing related to program rewriting is ended. In the case where not all parts have been rewritten (NO), the processing related to program rewriting proceeds to Step S305.

In Step S305, the state detecting part 15 determines whether or not the battery control program stored in the battery control program recording area 132 is being rewritten. The processing related to program rewriting proceeds to Step S306 in the case where none of the parts of the program is being rewritten (NO). In the case where the battery control program is being rewritten (YES), the state detecting part 15 stands by until the rewriting is finished.

In Step S306, the state detecting part 15 uses the data transceiving part 12 to issue a transmission instruction to the type 2 nodes 2a and 2b where divisional programs corresponding to parts of the battery control program that have not been rewritten are stored, and the processing related to program rewriting proceeds to Step S307. In Step S307, the data transceiving part 12 receives the divisional programs, and the processing related to program rewriting proceeds to Step S308.

In Step S308, whether or not a part of the battery control program that corresponds to a received divisional program has already been rewritten with previously received another divisional program is checked. The processing related to program rewriting proceeds to Step S310 in the case where the part has been rewritten (YES), and proceeds to Step S309 if not (NO). In Step S309, the program rewriting part 14 uses the program rewriting program to rewrite parts of the battery control program that correspond to the received divisional programs, and the processing related to program rewriting proceeds to Step S311.

In Step S310, the program verification part 9 uses the program verification program to perform verification on the part of the battery control program that corresponds to the received divisional program, and determines whether or not there is a problem. The processing related to program rewriting then proceeds to Step S311. In Step S311, the program verification part 9 determines whether all divisional programs have been received in Step S307 from the type 2 nodes that have transmitted the received divisional programs. The processing related to program rewriting proceeds to Step S307 in the case where not all divisional program have been received (NO), and goes back to Step S304 in the case where all divisional programs have been received (YES).

The flow of processing related to program rewriting at the EPS control unit 2a and the motor control unit 2b, which are type 2 nodes, will be described next with reference to FIG. 4A. The EPS control unit 2a (or the motor control unit 2b) executes normal processing related to the control of the EPS 20a (or the driving motor 20b) and processing related to program rewriting of the battery control unit 1. The processing related to program rewriting is executed when a rewrite execution notification is received from the tester 3, unless the normal processing is being executed. The processing related to program rewriting is the same at the EPS control unit 2a and the motor control unit 2b. The description given here therefore takes the EPS control unit 2a as an example.

After receiving a rewrite execution notification from the tester 3, the EPS control unit 2a waits for the reception of a divisional program in Step S401. When the data transceiving part 22a receives a divisional program (YES), the processing related to program rewriting proceeds to Step S402 to store the received divisional program in the divisional battery control program recording area 233a of the recording device 23a, and then proceeds to Step S403.

In Step S403, the EPS control unit 2a waits for a transmission instruction from the battery control unit 1 that instructs the EPS control unit 2a to transmit a divisional program. In the case where the transmission instruction has not been received (NO), the EPS control unit 2a stands by until the transmission instruction is received. When the transmission instruction is received (YES), the processing related to program rewriting proceeds to Step S404, where the transmittability determining part 24a determines that a divisional program can be transmitted, and the data transceiving part 22a transmits a divisional program stored in the divisional battery control program recording area 233a to the battery control unit 1. The processing related to program rewriting is then ended.

The flow of processing related to program rewriting at the tester 3, which is a type 3 node, will be described next with reference to FIG. 4B. The tester 3 notifies a relevant node that program rewriting is to be executed, and executes the transmission of rewriting program. The flow illustrated in FIG. 4B is a processing flow after the nodes are notified that program rewriting of the battery control unit 1 is to be executed.

In Step S411, the program dividing part 34 of the tester 3 first divides the rewriting program recorded in the battery control program recording area 331 of the recording device 33 into divisional programs that partially overlap with one another in data. In the subsequent Step S412, the data transceiving part 32 transmits the divisional programs separately to the type 2 nodes. In the first embodiment, where there are two type 2 nodes, the rewriting program is divided into two to create a divisional program A and a divisional program B, and the divisional program A is transmitted to, for example, the EPS control unit 2a while the divisional program B is transmitted to the motor control unit 2b.

In the next Step S413, whether or not all divisional programs have been transmitted is determined. The rewriting program transmitting processing goes back to Step S412 in the case where not all of the divisional programs have been transmitted (NO), and is ended in the case where all divisional programs have been transmitted (YES).

Figure 5:
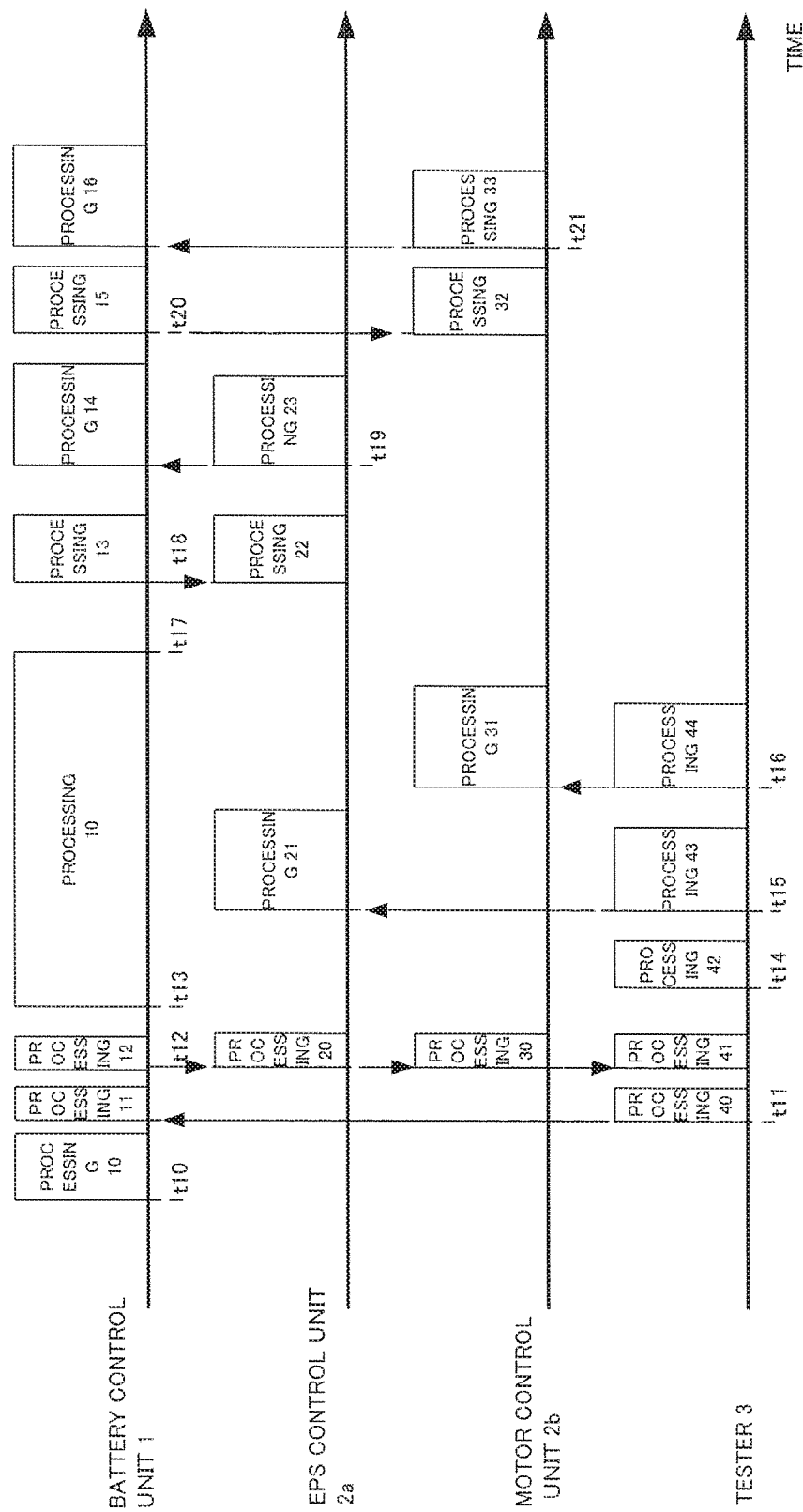
FIG. 5 is a diagram for illustrating along time axis the flows of processing procedures at respective nodes in the program rewriting system according to the first embodiment of the present invention.

The flows of processing procedures related to program rewriting that are executed at the respective nodes have now been described with reference to the flow charts of FIG. 3, FIG. 4A, and FIG. 4B. Next, all the flows of processing procedures at the nodes will be described with reference to a time chart of FIG. 5. In FIG. 5, the vertical axis represents the respective nodes and the horizontal axis represents time. The tester 3 is already connected to the CAN network 6 in FIG. 5, and all communications between the nodes are held over the CAN network 6. The EPS control device 2a and the motor control unit 2b are not executing their respective normal processing procedures in FIG. 5.

First, at t10, the battery control unit 1 is executing the normal processing related to the control of the battery 10 (processing 10). At t11, the tester 3 uses the data transceiving part 32 to notify the battery control unit 1 that program rewriting is to be executed (processing 40).

Receiving the rewrite execution notification from the tester 3, the battery control unit 1 uses the state detecting part 15 to determine whether or not the battery control unit 1 is in a state where the battery control program can be rewritten (processing 11). The battery control unit 1 is executing the normal processing at this point, and it is accordingly determined that the rewriting is inexecutable. At t12, the battery control unit 1 notifies the EPS control unit 2a, the motor control unit 2b, and the tester 3 that the rewriting is inexecutable (processing 12). The EPS control unit 2a, the motor control unit 2b, and the tester 3 separately receive the notification that program rewriting of the battery control unit 1 is inexecutable (processing 20, processing 30, and processing 41).

At t13, the battery control unit 1 resumes the normal processing related to the control of the battery 10 (processing 10). At t14, receiving the notification that program rewriting of the battery control unit 1 is inexecutable, the tester 3 uses the program dividing part 34 to divide the rewriting program for rewriting the battery control program that is stored in itself into divisional programs (processing 42). The rewriting program is divided into two divisional programs, the divisional program A and the divisional program B. The divisional program A and the divisional program B partially overlap with each other in data as illustrated in FIG. 17. The overlapped part is the divisional program C as described above.

At t15, the tester 3 transmits the divisional program A to the EPS control unit 2a (processing 43). The EPS control unit 2a receives and stores the divisional program A in the divisional battery control program recording area 233a (processing 21). At t16, the tester 3 first checks whether or not all divisional programs have been transmitted. The divisional program B has not been transmitted at this point. The tester 3 therefore continues the transmission of the rewriting program and transmits the divisional program B to the motor control unit 2b (processing 44).

The motor control unit 2b receives and stores the divisional program B in the divisional battery control program recording area 233b (processing 31). The tester 3 checks once more whether or not all divisional programs have been transmitted. All of the divisional programs have been transmitted at this point and the rewriting program transmitting processing is accordingly ended. When processing procedures up through this are finished, the tester 3 can be disconnected from the CAN network 6.

Thereafter, the battery control unit 1 finishes the normal processing at t17. At t18, the state detecting part 15 of the battery control unit 1 determines whether or not the battery control unit 1 is in a state where the battery control program can be rewritten. The state detecting part 15 determines here that the rewriting is executable because the normal processing is not being executed at this point. The state detecting part 15 next determines, by way of verification of the divisional program C, whether or not all areas (parts) of the battery control program stored in the battery control program recording area 132 of the recording device 13 have been rewritten without a problem. It is determined that not all of the parts have been rewritten at this point.

The state detecting part 15 further determines whether or not the battery control program stored in the battery control program recording area 132 is being rewritten. None of the parts of the battery control program is being rewritten at this point, and the battery control unit 1 accordingly instructs the EPS control unit 2a to transmit a divisional program (processing 13). The data transceiving part 22*a* of the EPS control unit 2*a* receives the instructions to transmit a divisional program (processing 22).

At t19, the transmittability determining part 24*a* of the EPS control unit 2*a* determines to transmit a divisional program to the battery control unit 1, and the data transceiving part 22*a* sequentially transmits the divisional program A stored in the divisional battery control program recording area 233*a* of the recording device 23*a* (processing 23). When the transmission is finished for all parts of the divisional program A, the EPS control unit 2*a* ends its processing related to program rewriting. Meanwhile, the battery control unit 1 receives the divisional program A and determines whether or not a part of the battery control program that corresponds to the received divisional program A has already been rewritten. The corresponding part has not been rewritten at this point, and the program rewriting part 14 accordingly rewrites the part of the battery control program that corresponds to the divisional program A. The part of the battery control program that corresponds to the divisional program A and that has not been rewritten is rewritten sequentially because the divisional program A is received sequentially (processing 14).

At t20, the state detecting part 15 determines whether or not verification has proved that all areas (parts) of the battery control program stored in the battery control program recording area 132 have been rewritten without a problem. It is determined at this point that not all of the parts have been rewritten. The state detecting part 15 also determines whether or not the battery control program stored in the battery control program recording area 132 is being rewritten. None of the parts of the battery control program is being rewritten at this point, and the battery control unit 1 accordingly instructs the motor control unit 2*b* to transmit a divisional program (processing 15). The data transceiving part 22*b* of the motor control unit 2*b* receives the instructions to transmit a divisional program (processing 32).

At t21, the transmittability determining part 24*b* of the motor control unit 2*b* determines to transmit a divisional program to the battery control unit 1, and the data transceiving part 22*b* sequentially transmits the divisional program B stored in the divisional battery control program recording area 233*b* of the recording device 23*b* (processing 33). When the transmission is finished for all parts of the divisional program B, the motor control unit 2*b* ends its processing related to program rewriting. Meanwhile, the battery control unit 1 receives the divisional program B and determines whether or not a part of the battery control program that corresponds to the received divisional program B has already been rewritten. The part corresponding to the divisional program C has already been rewritten at this point. The program rewriting part 14 accordingly rewrites a part of the battery control program that corresponds to the received divisional program B excluded by the divisional program C. For the part that corresponds to the divisional program C, the program verification part 9 verifies whether or not the data that has already been rewritten matches the data of the received divisional program C (processing 16). It is assumed that the rewritten data and the divisional program C are the same, and that no problem is found through the verification. The state detecting part 15 then determines whether or not all parts of the battery control program have been rewritten without finding a problem in the verification. At This time, all parts have been rewritten without a problem, and the processing related to the rewriting is accordingly ended.

The tester 3 in the first embodiment may include an encryption part for encrypting divisional programs so that divisional programs encrypted by the encryption part are transmitted to and stored in the EPS control unit 2*a* and the motor control unit 2*b*. Alternatively, the EPS control unit 2*a* and the motor control unit 2*b* may each include an encryption part to encrypt divisional programs received from the tester 3 before the divisional programs are stored.

The battery control unit 1 may include a decryption part for decrypting a divisional program that has been encrypted by an encryption part so that an encrypted divisional program received from the EPS control unit 2*a* or the motor control unit 2*b* is decrypted by the decryption part. Alternatively, the EPS control unit 2*a* and the motor control unit 2*b* may each include a decryption part to decrypt encrypted divisional programs stored in the EPS control unit 2*a* and the motor control unit 2*b* before the divisional programs are transmitted to the battery control unit 1. In short, each type 2 node may include an encryption part and a decryption part.

Including the encryption part and decryption part described above reduces the risk of divisional programs being deciphered by the third party over the CAN network 6, or the risk of divisional programs being deciphered by the third party when the divisional programs are stored in the EPS control unit 2*a* and the motor control unit 2*b*, thereby ensuring the security of program rewriting.

As described above, in the program rewriting system according to the first embodiment, the tester 3 notifies the battery control unit 1 that program rewriting is to be executed and, in the case where the battery control unit 1 is executing the normal processing related to the control of the battery 10 at the time, divides a rewriting program for rewriting the battery control program into divisional programs in a manner that allows a partial overlap in data between one divisional program and another. The tester 3 transmits the divisional programs separately to the EPS control unit 2*a* and the motor control unit 2*b*.

When the battery control unit 1 subsequently reaches a state where the program rewriting is executable, the EPS control unit 2*a* and the motor control unit 2*b* separately transmit the divisional programs stored in their own nodes to the battery control unit 1. Each time one of the divisional programs is received, the battery control unit 1 determines whether a part of the battery control program that corresponds to the received divisional program has been rewritten. In the case where the corresponding part has already been rewritten, the battery control unit 1 performs verification by comparing the received data with the rewritten data. In the case where the corresponding part has not been rewritten yet, the battery control unit 1 rewrites the corresponding part.

According to this program rewriting system and method, rewriting the battery control program at given timing while the battery control unit 1 is not executing the normal processing is achieved. In addition, even when the battery control unit 1 is executing the normal processing, the tester 3 can be disconnected from the CAN network 6 without waiting for the giving timing, as soon as the tester 3 divides the rewriting program into divisional programs in a manner that allows a partial overlap in data between one divisional program and another and finishes transmitting the divisional programs separately to the EPS control unit 2*a* and the motor control unit 2*b*. Program rewrite and verification can thus be executed efficiently.

Another advantage is that, because the rewriting program is stored in a plurality of type 2 nodes (two type 2 nodes in the first embodiment: the EPS control unit 2*a* and the motor control unit 2b) as divisional programs that are divided so as to partially overlap in data with one another, the need to give a type 2 node a recording capacity large enough to store the entire rewriting program is eliminated, thereby avoiding a situation in which the cost of one node is exceedingly higher than the cost of other nodes, and keeping the overall cost low.

The recording capacity for the storage of a divisional program can be minimized by limiting the overlapped part to an extent that is deemed necessary when the importance of the program and the like are taken into consideration.

Second Embodiment

Figure 6:
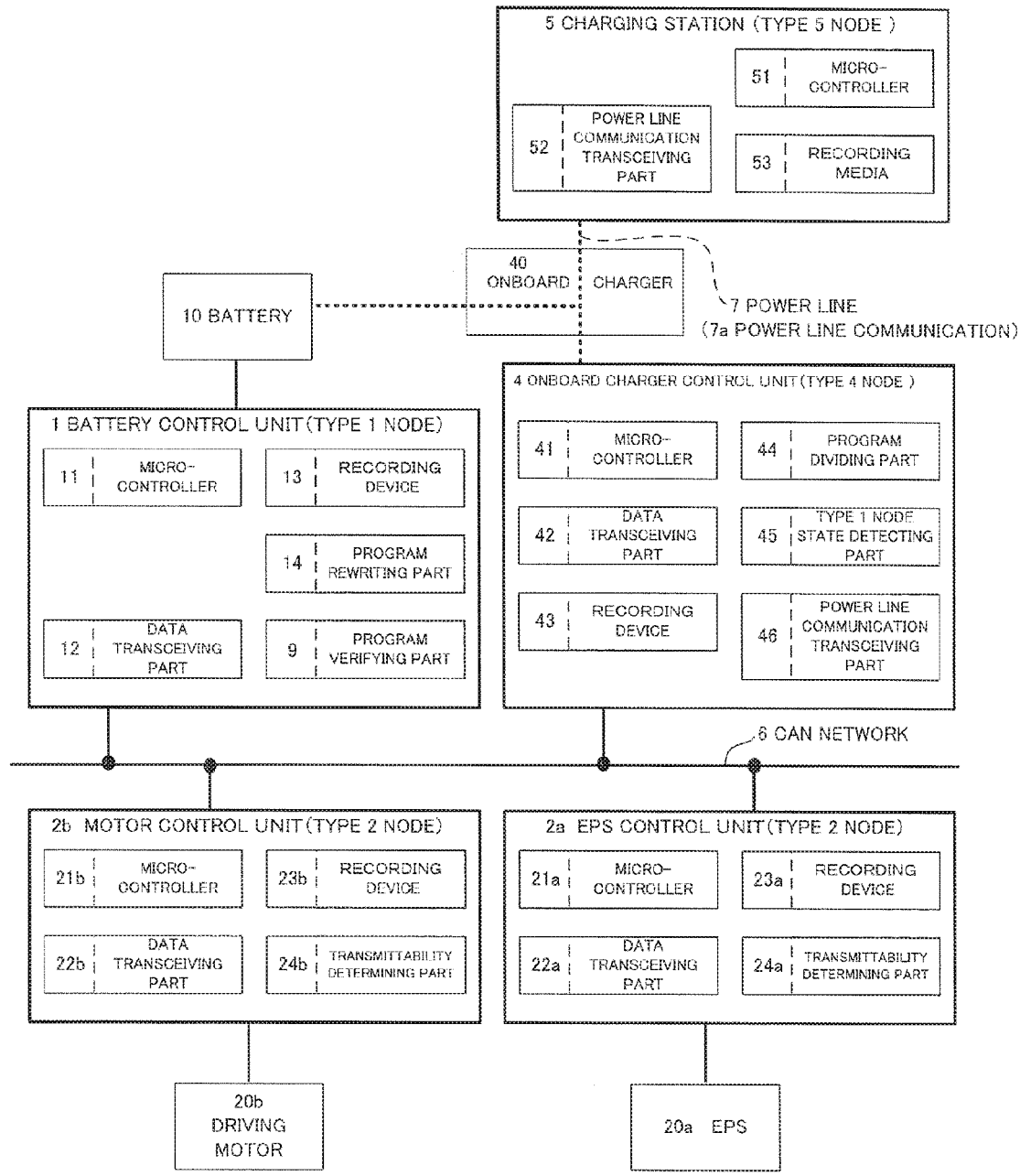
FIG. 6 is a block diagram for illustrating the configuration of a vehicle control system to which a program rewriting system according to a second embodiment of the present invention is applied.

FIG. 6 is a diagram for illustrating the configuration of a vehicle control system to which a program rewriting system and method according to a second embodiment of the present invention are applied. FIG. 7A and FIG. 7B are diagrams for illustrating the recording area configurations of recording media of a type 4 node and a type 5 node in the vehicle control system of FIG. 6. Components of control units and a charging station that are not directly relevant to the second embodiment are omitted from FIG. 6. Descriptions on components that have been described in the first embodiment (see FIG. 1) are omitted in this embodiment.

The vehicle control system according to the second embodiment does not include the tester 3 (a type 3 node) of the vehicle control system according to the first embodiment, and includes an onboard charger control unit 4, which is a type 4 node, and a charging station 5, which is a type 5 node. The onboard charger control unit 4 is connected to the CAN network 6, which is a first network, and a power line communication 7a, which is a second network, and can hold communication over the CAN network 6 to and from the battery control unit 1, which is a type 1 node, and the EPS control unit 2a and the motor control unit 2b, which are type 2 nodes.

The charging station 5 is not always connected to an onboard charger 40. The charging station 5 is connected to the onboard charger 40 by a power line 7 when necessary, e.g., when the battery 10 is charged. At the same time, the charging station 5 is connected by the power line 7 to the onboard charger control unit 4 to establish the power line communication 7a, which uses the power line 7, between the charging station 5 and the onboard charger control unit 4 via the onboard charger 40. This enables the onboard charger control unit 4 and the charging station 5 to communicate with each other over the power line communication 7a.

The configuration and functions of the charging station 5 will be described first briefly. A microcontroller 51 executes various types of processing related to the operation of the charging station 5. A power line communication transceiving part 52 transmits and receives data over the power line communication 7a to and from the onboard charger control unit 4, which is connected to the power line 7. A recording media 53 has a fifth recording area to store a rewriting program for rewriting the battery control program.

The recording area configuration of the recording media 53 will be described with reference to FIG. 7B. The recording media 53 includes a battery control program recording area 531, which is the fifth recording area for storing the rewriting program of the battery control program. The rewriting program stored in the battery control program recording area 531 is transmitted to the onboard charger control unit 4 over the power line communication 7a.

The configuration and functions of the onboard charger control unit 4 will be described next briefly. A microcontroller 41 executes various types of processing related to the operation of the onboard charger 40. A data transceiving part 42 transmits and receives data to and from other control units connected to the CAN network 6 (including the battery control unit 1, the EPS control unit 2a, and the motor control unit 2b) over the CAN network 6. A recording device 43 has a battery control program temporarily recording area 433, which is a fourth recording area.

The recording area configuration of the recording device 43 will be described with reference to FIG. 7A. The recording device 43 includes an onboard charger control program recording area 431 in which an onboard charger control program for determining the contents of control performed on the onboard charger 40 is stored, an onboard charger control program recording area (for data) 432 in which data and the like related to the control of the onboard charger 40 are stored, and the battery control program temporarily recording area 433, which is a buffer area for temporarily storing a rewriting program that is received from the charging station 5. As the battery control program temporarily recording area 433, which does not need to be large enough in capacity to store the entire battery control program, a free area or the like of the recording device 43 can be allocated.

A program dividing part 44, which is a second program dividing part, divides a rewriting program stored in the battery control program temporarily recording area 433 into divisional programs in a manner that allows a partial overlap in data between one divisional program and another, each time the stored rewriting program reaches a predetermined amount. The divisional programs created by the program dividing part 44 are transmitted separately to the EPS control unit 2a and the motor control unit 2b over the CAN network 6.

A type 1 node state detecting part 45, which is a third state detecting part, detects a state with respect to, for example, whether or not the battery control unit 1 is in a state where the battery control program can be rewritten, or whether or not all areas of the battery control program have been rewritten. In the case where the type 1 node state detecting part 45 detects that the battery control program can be rewritten, the EPS control unit 2a and the motor control unit 2b are notified via the CAN network 6. Receiving the notification, the EPS control unit 2a and the motor control unit 2b transmit the divisional programs stored in their own nodes to the battery control unit 1. A power line communication transceiving part 46 transmits and receives data over the power line communication 7a to and from the charging station 5, which is connected to the power line 7.

Figures 9A, 9B:
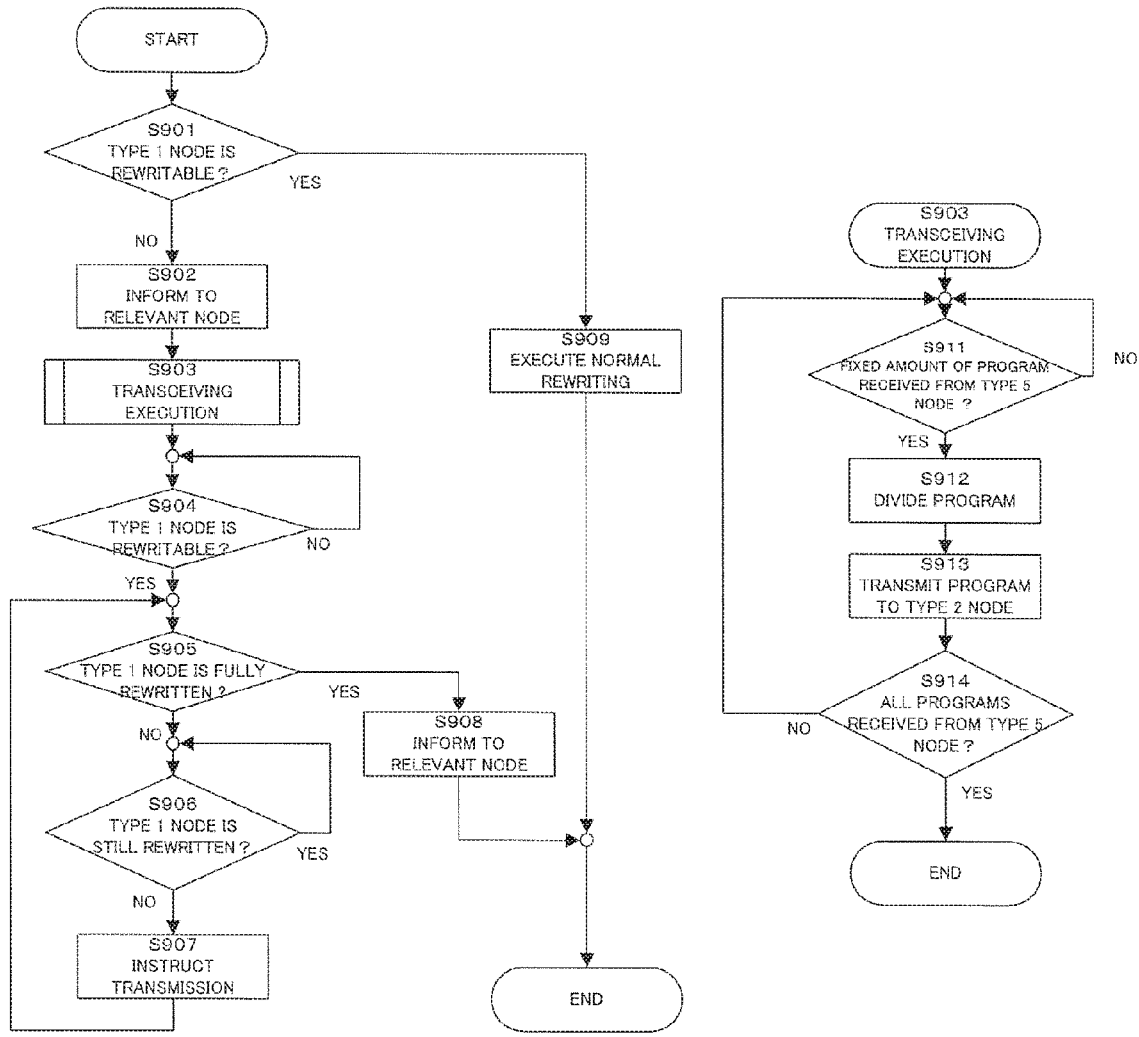
FIG. 9A and FIG. 9B are diagrams for illustrating the flow of processing at the type 4 node of the program rewriting system according to the second embodiment of the present invention, and the overall flow of the processing is illustrated in FIG. 9A while a sub-routine of transmission/reception processing, which is a part of the processing at the type 4 node, is illustrated in FIG. 9B.
Figure 10:
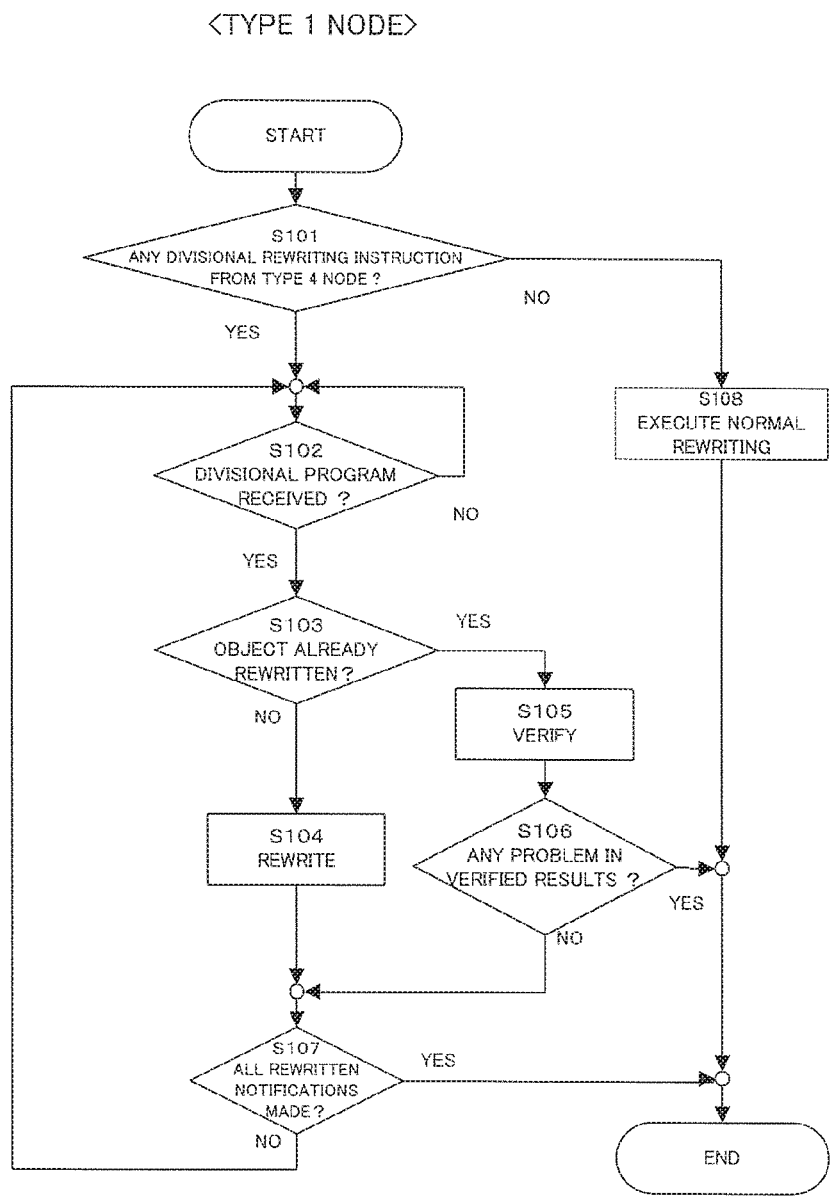
FIG. 10 is a diagram for illustrating the flow of processing at the type 1 node of the program rewriting system according to the second embodiment of the present invention.

The flows of processing procedures at the respective nodes of the program rewriting system according to the second embodiment will be described next with reference to flow charts of FIG. 8 to FIG. 10. However, the flow of processing at the EPS control unit 2a and the motor control unit 2b, which are type 2 nodes, is the same as the processing flow described in the first embodiment with reference to FIG. 4A, and a description thereof is therefore omitted in this embodiment.

Figure 8:
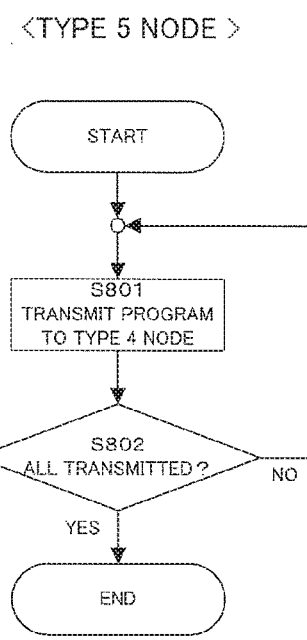
FIG. 8 is a diagram for illustrating the flow of processing at the type 5 node of the program rewriting system according to the second embodiment of the present invention.

FIG. 8 is a flow chart for illustrating the flow of processing that is related to program rewriting in the charging station 5, which is a type 5 node. The charging station 5 issues a rewrite instruction to the battery control unit 1 where a program is rewritten, and executes the transmission of rewriting program. The flow illustrated in FIG. 8 is a processing flow after the rewriting instructions are transmitted.

In Step S801, the power line communication transceiving part 52 first transmits a rewriting program for rewriting the battery control program to the onboard charger control unit 4 over the power line communication 7a, and the rewriting program transmitting processing proceeds to Step S802. In Step S802, whether or not all parts of the rewriting program have been transmitted is determined. The rewriting program transmitting processing goes back to Step S801 in the case where not all of parts of the rewriting program have been transmitted (NO), and is ended in the case where all parts of the rewriting program have been transmitted (YES).

The flow of processing that is related to program rewriting in the onboard charger control unit 4, which is a type 4 node, will be described next with reference to FIG. 9A and FIG. 9B. The onboard charger control unit 4 executes normal processing related to the control of the onboard charger 40, and processing related to the rewriting of a program of the battery control unit 1. The processing related to program rewriting is executed when the execution of rewriting is notified by the charging station 5, unless the normal processing is being executed. The flow illustrated in FIG. 9A is a processing flow after a rewrite execution notification is received from the charging station 5.

In Step S901, the type 1 node state detecting part 45 first determines whether or not the battery control unit 1 is in a state where the battery control program can be rewritten. Specifically, the type 1 node state detecting part 45 determines whether or not the battery control unit 1 is executing normal processing related to the control of the battery 10. In the case where the battery control unit 1 is not executing normal processing, the processing related to program rewriting proceeds to Step S909, where the onboard charger control unit 4 executes normal rewrite processing. The normal rewriting in Step S909 is a conventional rewriting method to rewrite a battery control program of battery control unit 1 through data transfer of the onboard charger control unit 4 from the charging station 5, not by dividing a rewriting program which is a feature of the present invention. A description on the normal rewrite processing is therefore omitted.

In the case where the battery control unit 1 is executing the normal processing in Step S901, program rewriting is inexecutable (NO). The processing related to program rewriting accordingly proceeds to Step S902, where the data transceiving part 42 informs via the CAN network 6 a relevant node of the execution of partial rewrite. In Step S903, the onboard charger control unit 4 receives a rewriting program from the charging station 5, divides the rewriting program into divisional programs in a manner that allows a partial overlap in data between one divisional program and another, and executes transmission/reception processing in which the divisional programs are transmitted to the type 2 nodes. The transmission/reception processing of Step S903 will be described later with reference to FIG. 9B.

In Step S904, the type 1 node state detecting part 45 again determines whether the battery control unit 1 is in a state where the program can be rewritten by determining whether or not the battery control unit 1 is executing the normal processing. In the case where program rewriting is executable (YES), the processing related to program rewriting proceeds to Step S905. In the case where program rewriting is inexecutable (NO), the onboard charger control unit 4 stands by until the battery control unit 1 reaches a state where the program can be rewritten.

In Step S905, the type 1 node state detecting part 45 further determines whether or not all areas (parts) of the battery control program stored in the battery control program recording area 132 of the battery control unit 1 have been rewritten. In the case where all parts of the battery control program have been rewritten (YES), the processing related to program rewriting proceeds to Step S908, where the data transceiving part 42 transmits a message to the effect that the rewriting is finished for all parts to the battery control unit 1, and is then ended.

When it is determined in Step S905 that not all of the parts of the battery control program have been rewritten (NO), the processing related to program rewriting proceeds to Step S906, where the type 1 node state detecting part 45 determines whether or not program rewriting is being executed in the battery control unit 1. In the case where none of the parts stored in the battery control program recording area 132 is being rewritten (NO), the processing related to program rewriting proceeds to Step S907. In the case where program rewriting is being executed (YES), the onboard charger control unit 4 stands by until the rewriting is finished.

In Step S907, the type 1 node state detecting part 45 detects a part of the battery control program stored in the battery control program recording area 132 that has not been rewritten, and the data transceiving part 42 issues instructions to a type 2 node in which a divisional program corresponding to the detected part is stored in order to instruct the type 2 node to transmit the divisional program.

Details of the transmission/reception processing of Step S903 will be described next with reference to FIG. 9B. In Step S911, the onboard charger control unit 4 determines whether or not a predetermined amount of the rewriting program of the battery control program that is transmitted from the charging station 5 has been received. Receiving all parts of the rewriting program, which is large in capacity, takes some time, and received parts of the rewriting program are stored in the battery control program temporarily recording area 433 at appropriate timing. When it is determined in Step S911 that the predetermined amount has been received (YES), the transmission/reception processing proceeds to Step S912. In the case where the predetermined amount has not been received (NO), the onboard charger control unit 4 stands by until the predetermined amount is received.

In Step S912, the program dividing part 44 divides the battery control program stored in the battery control program temporarily recording area 433 into divisional programs in a manner that allows a partial overlap in data between one divisional program and another. In the subsequent Step S913, the data transceiving part 42 transmits each divisional program separately to one of the type 2 nodes (the EPS control unit 2a and the motor control unit 2b). In Step S914, whether or not all parts of the rewriting program have been received from the charging station 5 is determined. The transmission/reception processing goes back to Step S911 in the case where not all of the parts have been received (NO), and is ended in the case where all parts have been received (YES).

The flow of processing related to program rewriting in the battery control unit 1, which is a type 1 node, will be described next with reference to FIG. 10. The battery control unit 1 executes normal processing related to the control of the battery 10, and processing related to the rewriting of the battery control program. The processing related to program rewriting is executed when rewriting instructions are issued from the charging station 5. The flow illustrated in FIG. 10 is a processing flow after the charging station 5 notifies that the rewriting is to be executed.

In Step S101, the battery control unit 1 first determines whether or not instructions to execute partial rewrite (Step S902 of FIG. 9A) have been issued from the onboard charger control unit 4. The processing related to program rewriting proceeds to Step S102 in the case where the divisional rewriting instructions have been issued (YES). In the case where the instructions have not been issued (NO), normal program rewriting processing is executed in Step S108. The normal rewriting in Step S108 is a conventional rewriting method to rewrite a battery control program of the battery control unit 1 through data transfer of the onboard charger control unit 4 from the charging station 5, not by dividing a rewriting program which is a feature of the present invention. A description on the normal rewrite processing is therefore omitted. In Step S102, the data transceiving part 12 waits for the reception of a divisional program. The processing related to program rewriting proceeds to Step S103 when a divisional program is received (YES). In the case where no divisional program is received in Step S102 (NO), the battery control unit 1 stands by until a divisional program is received.

In Step S103, the battery control unit 1 checks whether a part of the battery control program that corresponds to the received divisional program has already been rewritten with another received divisional program. The processing related to program rewriting proceeds to Step S105 in the case where the corresponding part has been rewritten (YES), and proceeds to Step S104 in the case where the corresponding part has not been rewritten (NO). In Step S104, the program rewriting part 14 uses the program rewriting program to rewrite the part of the battery control program that corresponds to the received divisional program, and the processing related to program rewriting proceeds to Step S107. In Step S105, the program verification part 9 uses a program verification program to perform verification on the part of the battery control program that corresponds to the received divisional program, and the processing related to program rewriting proceeds to Step S106. In Step S106, whether or not there is a problem is determined based on the result of the verification. The rewriting program is ended when there is a problem (YES), and proceeds to Step S107 when there is no problem (NO). In Step S107, whether or not all parts of the battery control program have been rewritten is determined based on the notification from the onboard charger control unit 4 (Step S908 of FIG. 9A). The processing related to program rewriting goes back to Step S102 to wait for the reception of another divisional program in the case where the notification has not been received (NO), and is ended in the case where the notification has been received (YES).

Figure 11:
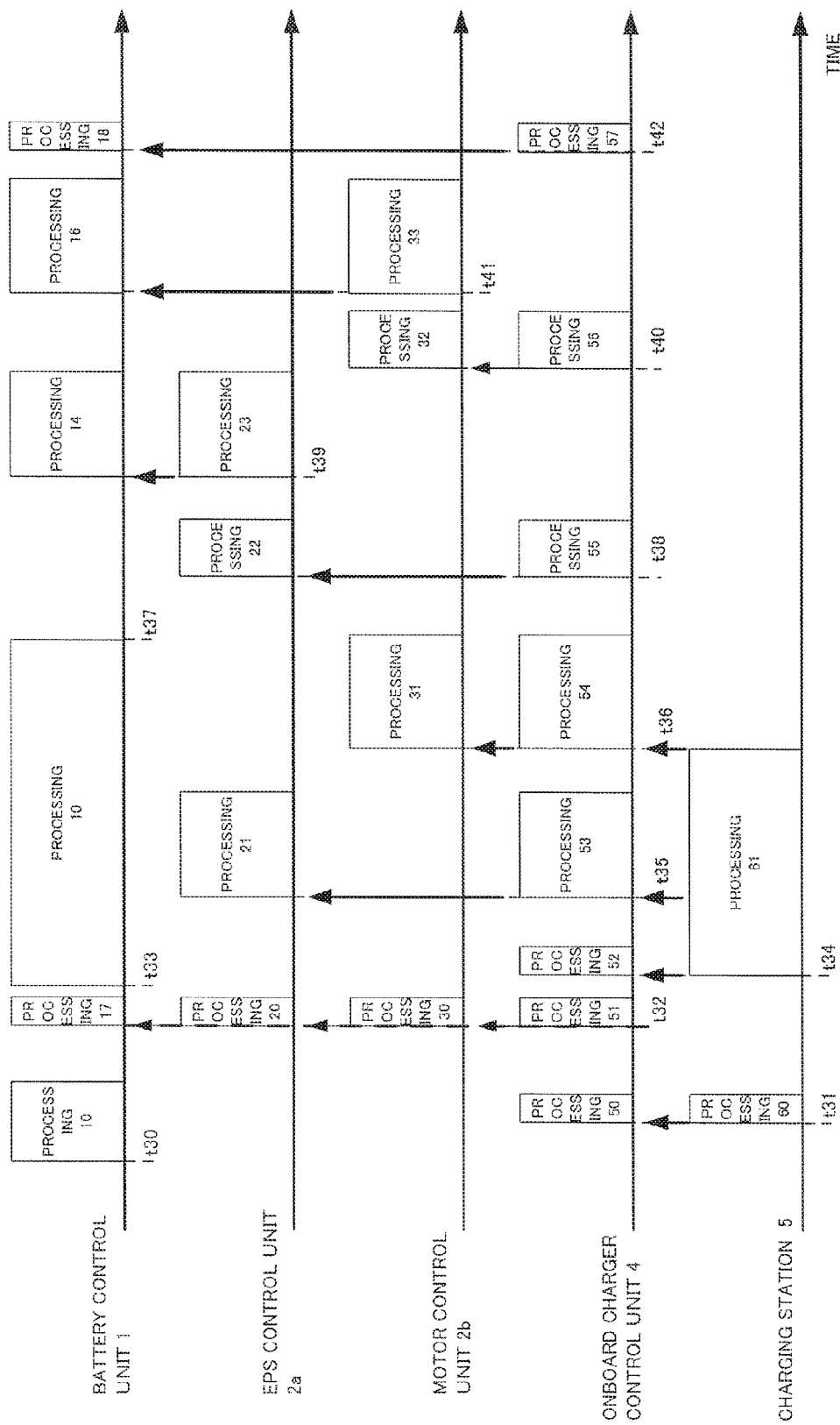
FIG. 11 is a diagram for illustrating along time axis the flows of processing procedures at respective nodes in the program rewriting system according to the second embodiment of the present invention.

The flows of processing procedures related to program rewriting at the respective nodes have now been described with reference to the flow charts of FIG. 8 to FIG. 10 (and FIG. 4A). Next, all the flows of processing procedures at the nodes will be described with reference to a time chart of FIG. 11. In FIG. 11, the vertical axis represents the respective nodes and the horizontal axis represents time. The charging station 5 and the onboard charger control unit 4 are already connected to the power line communication 7a via the onboard charger 40 in FIG. 11. The EPS control unit 2a and the motor control unit 2b are not executing their respective normal processing procedures in FIG. 11.

At t30, the battery control unit 1 is executing the normal processing related to the control of the battery 10 (processing 10). At t31, the charging station 5 uses the power line communication transceiving part 52 to notify via the power line communication 7a the onboard charger control unit 4 that program rewriting of the battery control unit 1 is executed (processing 60).

The onboard charger control unit 4 receives the program rewrite execution notification and uses the type 1 node state detecting part 45 to determine whether or not program rewriting in the battery control unit 1 is executable (processing 50). The battery control unit 1 is executing the normal processing at this point, and the type 1 node state detecting part 45 accordingly determines that program rewriting is inexecutable.

At t32, the onboard charger control unit 4 notifies the battery control unit 1, the EPS control unit 2a, and the motor control unit 2b that, because program rewriting is inexecutable, the divisional rewriting is to be executed instead (processing 51). The battery control unit 1, the EPS control unit 2a, and the motor control unit 2b separately receive the divisional rewrite execution notification (processing 17, processing 20, and processing 30).

At t33, the battery control unit 1 resumes the normal processing (processing 10). At t34, the charging station 5 starts transmitting over the power line communication 7a the rewriting program of the battery control program that is stored in the charging station 5 to the onboard charger control unit 4 (processing 61). The onboard charger control unit 4 stores received parts of the rewriting program in the battery control program temporarily recording area 433 at appropriate timing (processing 52).

At t35, in the case where the received parts of the rewriting program exceed a predetermined amount, the onboard charger control unit 4 uses the program dividing part 44 to create a divisional program A by dividing the rewriting program that is stored in the battery control program temporarily recording area 433 in a manner that allows a partial overlap in data (the overlapping part is a divisional program C) between the divisional program A and another divisional program (a divisional program B). The data transceiving part 42 transmits the created divisional program A to the EPS control unit 2a (processing 53). The EPS control unit 2a stores the received divisional program A in the divisional battery control program recording area 233a (processing 21).

When the received parts of the rewriting program exceed the predetermined amount again, the onboard charger control unit 4 uses the program dividing part 44 at t36 to create the divisional program B by dividing the battery control program rewriting program that is recorded in the battery control program temporarily recording area 433 in a manner that allows a partial overlap in data (the overlapped part is the divisional program C) between the divisional program B and another divisional program (the divisional program A). The data transceiving part 42 transmits the created divisional program B to the motor control unit 2b (processing 54). The motor control unit 2b stores the received divisional program B in the divisional battery control program recording area 233b (processing 31).

When all parts of the rewriting program have been received by the onboard charger control unit 4, the charging station 5 ends its own processing related to program rewriting. From then on, the charging station 5 does not need to be connected to the onboard charger 40, and can be disconnected even when program rewriting is being executed in the battery control unit 1.

The battery control unit 1 finishes the normal processing at t37. At t38, the type 1 node state detecting part 45 of the onboard charger control unit 4 determines whether or not the battery control unit 1 is in a state where the program can be rewritten. The battery control unit 1 is not executing the normal processing at this point, and the type 1 node state detecting part 45 accordingly determines that program rewriting is executable.

The type 1 node state detecting part 45 next determines whether or not all areas (parts) of the battery control program stored in the battery control program recording area 132 of the recording device 13 have been rewritten. It is determined that not all of the parts have been rewritten.

The type 1 node state detecting part 45 also determines whether or not the program in the battery control program recording area 132 of the battery control unit 1 is being rewritten. The program is not being rewritten at this point, and the data transceiving part 42 accordingly issues an instruction to the EPS control unit 2a to transmit a divisional program (processing 55). The data transceiving part 22a of the EPS control unit 2a receives the divisional program transmission instruction (processing 22).

At t39, the transmittability determining part 24a of the EPS control unit 2a determines to transmit a divisional program to the battery control unit 1, and the data transceiving part 22a sequentially transmits the divisional program A stored in the divisional battery control program recording area 233a of the recording device 23a (processing 23). When the transmission is finished for all parts of the divisional program A, the EPS control unit 2a ends its processing related to program rewriting. Meanwhile, the battery control unit 1 receives the divisional program A and determines whether or not a part of the battery control program that corresponds to the received divisional program A has already been rewritten. The corresponding part has not been rewritten at this point, and the program rewriting part 14 accordingly rewrites the part of the battery control program that corresponds to the divisional program A. The part of the battery control program that corresponds to the divisional program A and that has not been rewritten is rewritten sequentially because the divisional program A is received sequentially (processing 14).

At t40, the type 1 node state detecting part 45 of the onboard charger control unit 4 determines whether or not the battery control unit 1 is in a state where the program can be rewritten. The battery control unit 1 is not executing the normal processing at this point, and the type 1 node state detecting part 45 accordingly determines that program rewriting is executable. The type 1 node state detecting part 45 next determines whether or not all areas (parts) of the battery control program stored in the battery control program recording area 132 of the recording device 13 have been rewritten. It is determined not all of the parts have been rewritten at this point.

The type 1 node state detecting part 45 also determines whether or not the program in the battery control program recording area 132 of the battery control unit 1 is being rewritten. The program is not being rewritten at this point, and the data transceiving part 42 accordingly issues instructions to the motor control unit 2b to transmit a divisional program (processing 56). The data transceiving part 22b of the motor control unit 2b receives the divisional program transmission instructions (processing 32).

At t41, the transmittability determining part 24b of the motor control unit 2b determines to transmit a divisional program to the battery control unit 1, and the data transceiving part 22b sequentially transmits the divisional program B recorded in the divisional battery control program recording area 233b of the recording device 23b (processing 33). When the transmission is finished for all parts of the divisional program B, the motor control unit 2b ends its processing related to program rewriting.

Meanwhile, the battery control unit 1 receives the divisional program B and determines whether or not a part of the battery control program that corresponds to the received divisional program B has already been rewritten. The part corresponding to the divisional program C has already been rewritten at this point. The program rewriting part 14 accordingly rewrites a part of the battery control program that corresponds to the received divisional program B minus the divisional program C. For the part that corresponds to the divisional program C, the program verification part 9 performs verification about whether or not the data that has already been rewritten matches the data of the received divisional program C (processing 16). It is assumed that the result of the verification reveals no problem at this point. If a problem (inconsistency with the data that has been rewritten) is found at the verification stage, all steps of the rewriting processing are ended.

At t42, the type 1 node state detecting part 45 of the onboard charger control unit 4 determines whether or not all parts of the battery control program have been rewritten. Rewriting has been finished for all parts at this point. The data transceiving part 42 accordingly notifies the battery control unit 1 that program rewriting is complete, and the onboard charger control unit 4 ends its own processing related to program rewriting (processing 57). Receiving this notification, the battery control unit 1 ends its processing related to program rewriting (processing 18).

As described above, in the program rewriting system according to the second embodiment, the charging station 5 transmits a rewriting program for rewriting the battery control program to the onboard charger control unit 4 in the case where the battery control unit 1 is executing the normal processing related to the control of the battery 10 at the time when the charging station 5 notifies the onboard charger control unit 4 that program rewriting of the battery control unit 1 is to be executed. When a predetermined amount of the rewriting program is received (stored), the onboard charger control unit 4 creates the divisional program A by dividing the rewriting program in a manner that allows a partial overlap in data (the overlapped part is the divisional program C) between the divisional program A and another divisional program, and transmits the divisional program A to the EPS control unit 2a. When the predetermined amount of the rewriting program is stored again, the onboard charger control unit 4 creates the divisional program B, which partially overlaps in data (the overlapping part is the divisional program C illustrated in FIG. 17) with another divisional program, and transmits the divisional program B to the motor control unit 2b.

When the battery control unit 1 subsequently reaches a state where program rewriting is executable, the EPS control unit 2a and the motor control unit 2b transmit the divisional program A and the divisional program B, respectively, to the battery control unit 1. Each time one of the divisional programs is received, the battery control unit 1 determines whether a part of the battery control program that corresponds to the received divisional program has already been rewritten. The battery control unit 1 performs verification in the case where the corresponding part has been rewritten, and rewrites the corresponding part in the case where the corresponding part has not been rewritten yet.

According to this program rewriting system, rewriting and verifying of the battery control program at given timing when the battery control unit 1 is not executing the normal processing is achieved as in the first embodiment. In addition, even when the battery control unit 1 is executing the normal processing, the charging station 5 can be disconnected from the power line communication 7a without waiting for the giving timing, as soon as the charging station 5 finishes transmitting the rewriting program to the onboard charger control unit 4. Program rewrite and verification can thus be executed efficiently.

In the second embodiment, the onboard charger control unit 4 creates a divisional program each time a predetermined amount of the rewriting program is received (stored), by dividing the rewriting program so as to include contents partially overlapped with another divisional program, and transmits the divisional program to relevant one of the EPS control unit 2a and the motor control unit 2b, which are type 2 nodes, as soon as the divisional program is created. Accordingly, another advantage of the second embodiment is that the onboard charger control unit 4 does not need to have a recording capacity large enough to store the entire rewriting program. The need to give a type 2 node a recording capacity large enough to store the entire rewriting program is also eliminated as in the first embodiment, thereby avoiding a situation in which the cost of one node is exceedingly higher than the cost of other nodes, and keeping the overall cost low.

The recording capacity for the storage of a divisional program can be minimized by limiting the overlapping part to an extent that is deemed necessary when the importance of the program and the like are taken into consideration.

Third Embodiment

Figure 12:
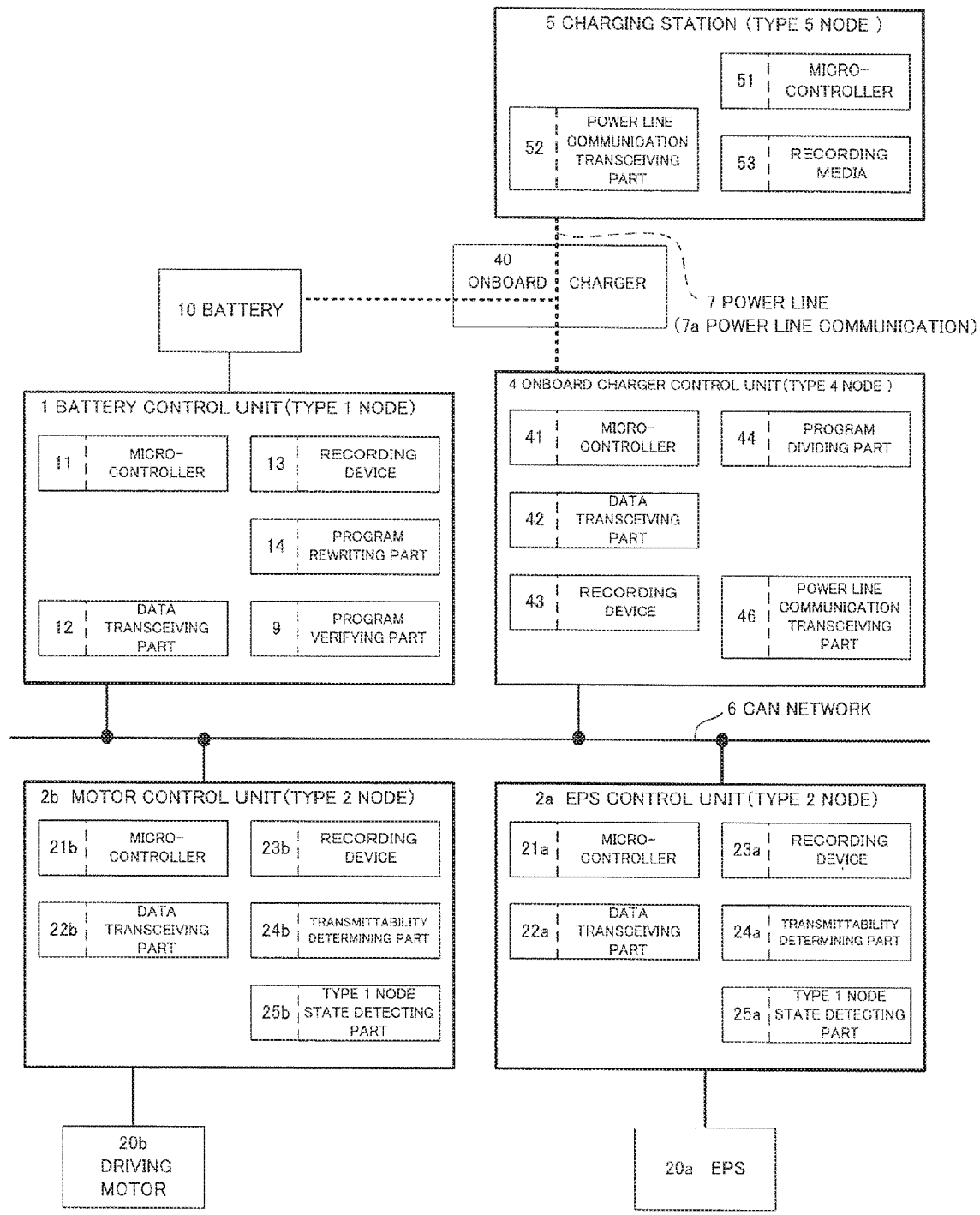
FIG. 12 is a block diagram for illustrating the configuration of a vehicle control system to which a program rewriting system according to a third embodiment of the present invention is applied.

FIG. 12 is a diagram for illustrating the configuration of a vehicle control system to which a program rewriting system and method according to a third embodiment of the present invention are applied. Components of control units and a charging station that are not directly relevant to the third embodiment are omitted from FIG. 12.

In the second embodiment, the type 1 node state detecting part 45 is included in the onboard charger control unit 4, which is a type 4 node. In the third embodiment, type 1 node state detecting parts 25a and 25b are respectively included in the EPS control unit 2a and the motor control unit 2b, which are type 2 nodes. The rest of the configuration and functions of the vehicle control system are the same as those in the second embodiment, and descriptions thereof are therefore omitted in this embodiment.

Similarly to the type 1 node state detecting part 45 (see FIG. 6) included in the onboard charger control unit 4 in the second embodiment, the type 1 node state detecting part 25a and 25b included in the EPS control unit 2a and the motor control unit 2b, respectively, detect a state with respect to, for example, whether or not the battery control unit 1 is in a state where the battery control program can be rewritten, or whether or not all parts of the battery control program have been rewritten.

The flows of processing procedures at the respective nodes of the program rewriting system according to the third embodiment will be described with reference to flow charts of FIG. 13 and FIG. 14. However, the flows of processing procedures at the battery control unit 1, which is a type 1 node, and the charging station 5, which is a type 5 node, are the same as those in the second embodiment, and descriptions thereof are therefore omitted in this embodiment (see FIG. 8 and FIG. 10).

Figure 13:
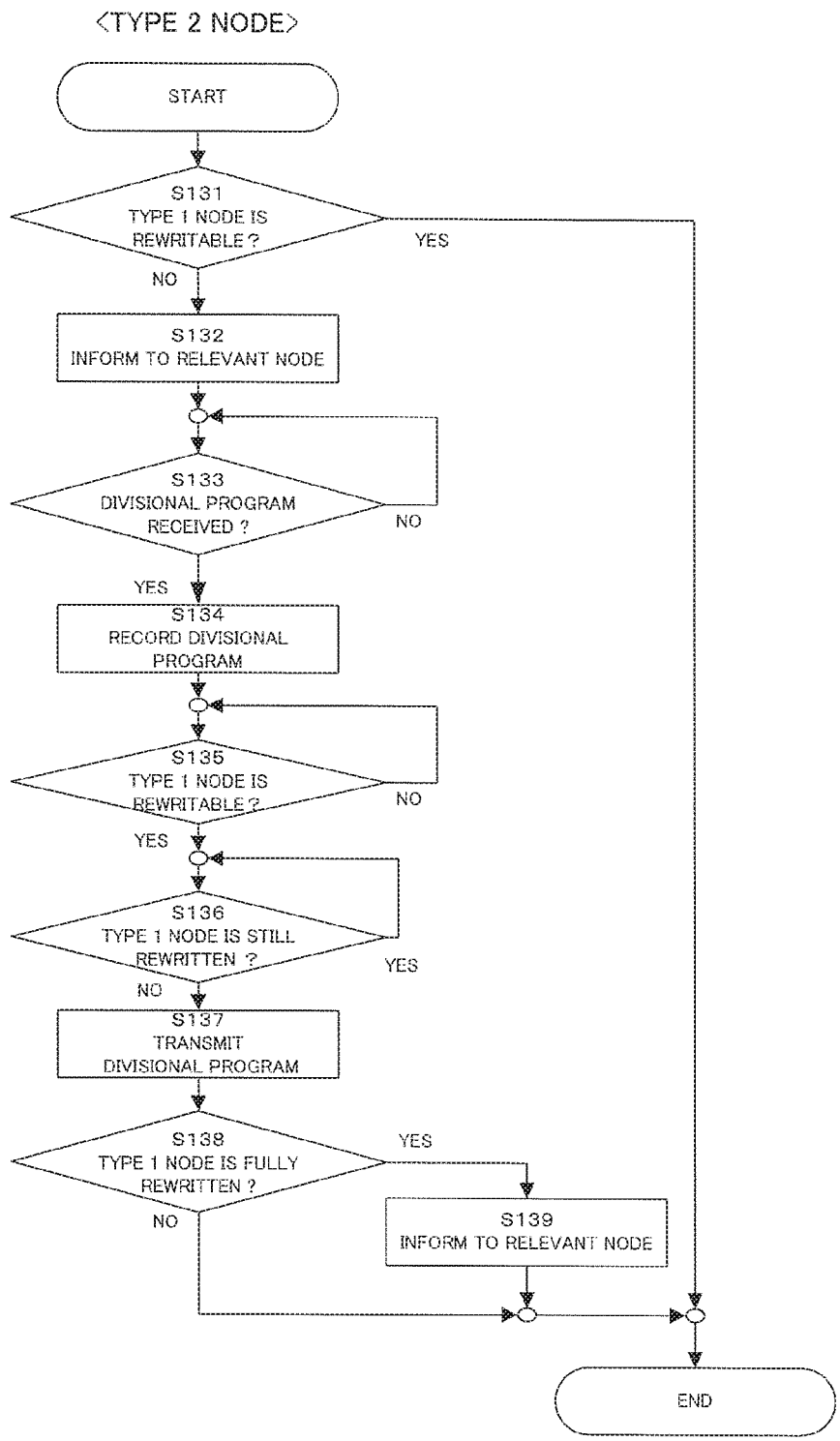
FIG. 13 is a diagram for illustrating the flow of processing at the type 2 node of the program rewriting system according to the third embodiment of the present invention.
Figure 14:
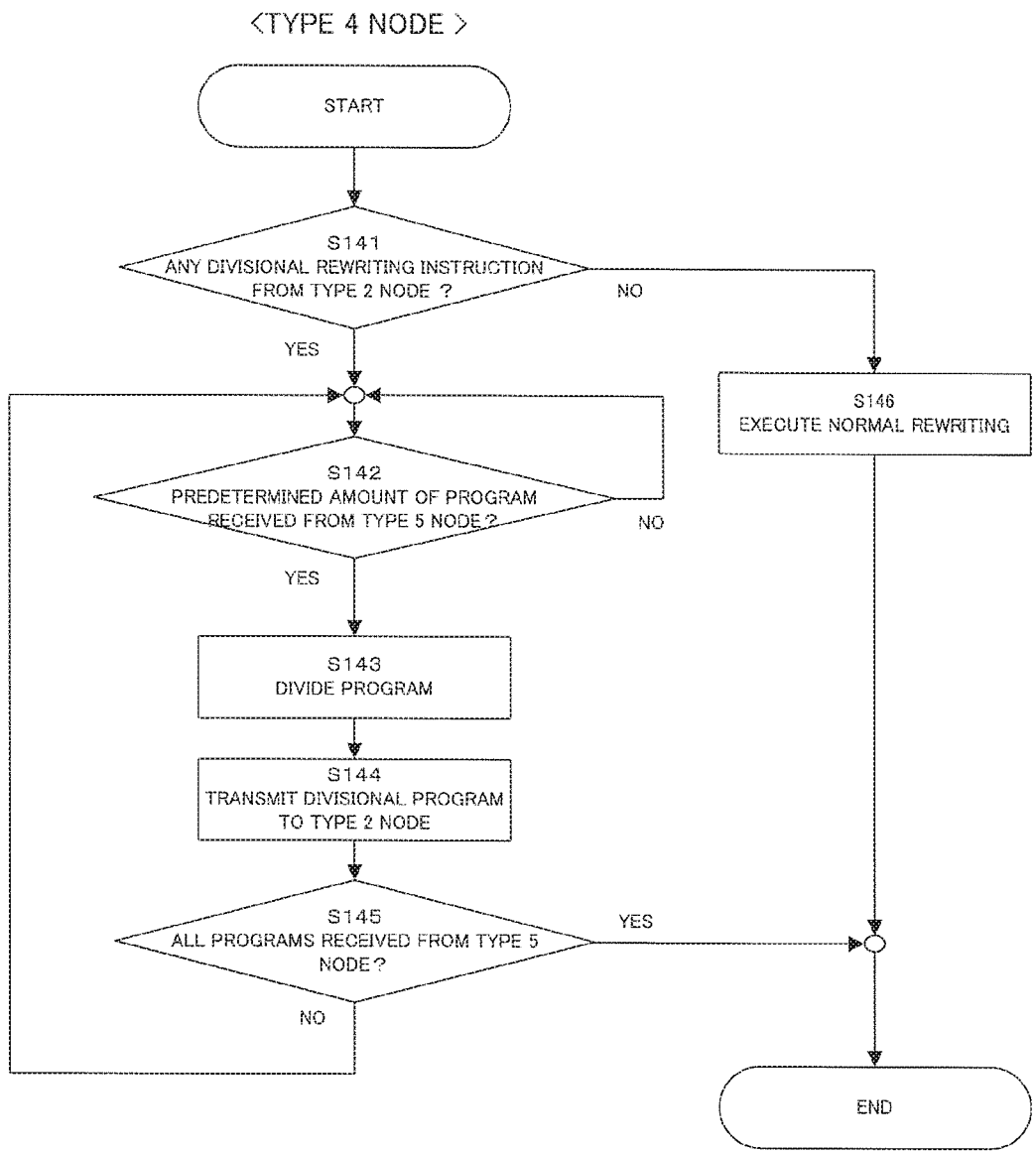
FIG. 14 is a diagram for illustrating the flow of processing at the type 4 node of the program rewriting system according to the third embodiment of the present invention.

FIG. 13 is a flow chart for illustrating the flow of processing related to program rewriting at the EPS control unit 2a and the motor control unit 2b, which are type 2 nodes. The EPS control unit 2a (or the motor control unit 2b) executes normal processing related to the control of the EPS 20a (or the driving motor 20b) and processing related to program rewriting of the battery control unit 1. The processing related to program rewriting is executed when a rewrite execution notification is issued from the charging station 5, unless the normal processing is being executed. The processing related to program rewriting is the same at the EPS control unit 2a and the motor control unit 2b. The description given in this embodiment therefore takes the EPS control unit 2a as an example.

The EPS control unit 2a receives a rewrite execution notification from the charging station 5 via the onboard charger control unit 4. Thereafter, in Step S131, the type 1 node state detecting part 25a determines whether or not the battery control unit 1 is in a state where the battery control program can be rewritten. Specifically, the type 1 node state detecting part 25a determines whether or not the battery control unit 1 is executing the normal processing related to the control of the battery 10. In the case where the normal processing is not being executed, normal program rewriting processing is executable, and the processing related to program rewriting of the present invention is accordingly ended.

When it is determined in Step S131 that the battery control unit 1 is executing the normal processing, program rewriting is inexecutable (NO), and the processing related to program rewriting accordingly proceeds to Step S132. In Step S132, the data transceiving part 22a notifies a relevant node that the divisional rewriting is to be executed, and the processing related to program rewriting proceeds to Step S133. In the case where a divisional program is received from the onboard charger control unit 4 (YES) in Step S133, the processing related to program rewriting proceeds to Step S134. In the case where a divisional program is not received (NO) in Step S133, the EPS control unit 2a stands by until a divisional program is received.

In Step S134, the divisional program received by the data transceiving part 22a is recorded in the divisional battery control program recording area 233a of the recording device 23a, and the processing related to program rewriting proceeds to Step S135. In Step S135, the type 1 node state detecting part 25a again determines whether or not the battery control unit 1 is in a state where the battery control program can be rewritten. In the case where program rewriting is executable (YES), the processing related to program rewriting proceeds to Step S136. In the case where program rewriting is inexecutable (NO), the EPS control unit 2a stands by until the battery control unit 1 reaches a state where program rewriting is executable.

In Step S136, the type 1 node state detecting part 25a determines whether or not program rewriting is being executed in the battery control unit 1. In the case where none of parts stored in the battery control program recording area 132 of the battery control unit 1 is being rewritten (NO), the processing related to program rewriting proceeds to Step S137. In the case where the battery control program is being rewritten (YES), the EPS control unit 2a stands by until the rewriting is finished.

In Step S137, the transmittability determining part 24a determines to transmit a divisional program, and the data transceiving part 22a sequentially transmits the divisional program recorded in the divisional battery control program recording area 233a of the recording device 23a to the battery control unit 1. When the transmission is finished for all parts of the divisional program, the processing related to program rewriting proceeds to Step S138.

In Step S138, the type 1 node state detecting part 25a determines whether or not all parts of the battery control program in the battery control unit 1 have been rewritten. In the case where all parts have been rewritten (YES), the processing related to program rewriting proceeds to Step S139, where the data transceiving part 22a informs a relevant node that all parts of the battery control program have been rewritten, and is then ended. In the case where not all of the parts have been rewritten (NO) also, the processing related to program rewriting is ended because the EPS control unit 2a has finished transmitting the divisional program that is stored in its own node.

The flow of processing related to program rewriting at the onboard charger control unit 4, which is a type 4 node, will be described next with reference to FIG. 14. The onboard charger control unit 4 executes normal processing related to the control of the onboard charger 40, and processing related to the rewriting of a program in the battery control unit 1. The processing related to program rewriting is executed when the charging station 5 notifies the onboard charger control unit 4 that the rewriting is to be executed, unless the normal processing is being executed. The flow illustrated in FIG. 14 is a processing flow after the rewrite execution notification is received from the charging station 5.

In Step S141, the onboard charger control unit 4 first determines whether or not instructions to execute divisional rewriting has been issued from one of the EPS control unit 2a and the motor control unit 2b, which are type 2 nodes. The processing related to program rewriting proceeds to Step S142 in the case where the divisional rewriting instructions have been issued (YES) and, in the case where the instructions have not been issued (NO), proceeds to Step S146, where normal rewrite processing is executed. The normal rewriting in Step S146 is a conventional rewriting method to rewrite a battery control program of battery control unit 1 through data transfer of the onboard charger control unit 4 from the charging station 5, not by dividing a rewriting program which is a feature of the present invention. A description on the normal rewrite processing is therefore omitted.

In Step S142, the onboard charger control unit 4 determines whether or not a predetermined amount of the battery control program rewriting program that is transmitted from the charging station 5, which is a type 5 node, has been received. Receiving all parts of the battery control program rewriting program transmitted from the charging station 5 which is large in capacity takes some time. Received parts of the battery control program rewriting program are stored in the battery control program temporarily recording area 433 at appropriate timing. When it is determined in Step S142 that the predetermined amount has been received (YES), the processing related to program rewriting proceeds to Step S143. In the case where the predetermined amount has not been received (NO), the onboard charger control unit 4 stands by until the predetermined amount is received.

In Step S143, the program dividing part 44 divides the battery control program recorded in the battery control program temporarily recording area 433 into divisional programs in a manner that allows a partial overlap in data between one divisional program and another. In the subsequent Step S144, the data transceiving part 42 transmits each divisional program separately to one of the type 2 nodes (the EPS control unit 2a and the motor control unit 2b). In Step S145, whether or not all parts of the battery control program rewriting program have been received from the charging station 5 is determined. The processing related to program rewriting goes back to Step S142 in the case where not all of the parts have been received (NO), and is ended in the case where all parts have been received (YES).

Figure 15:
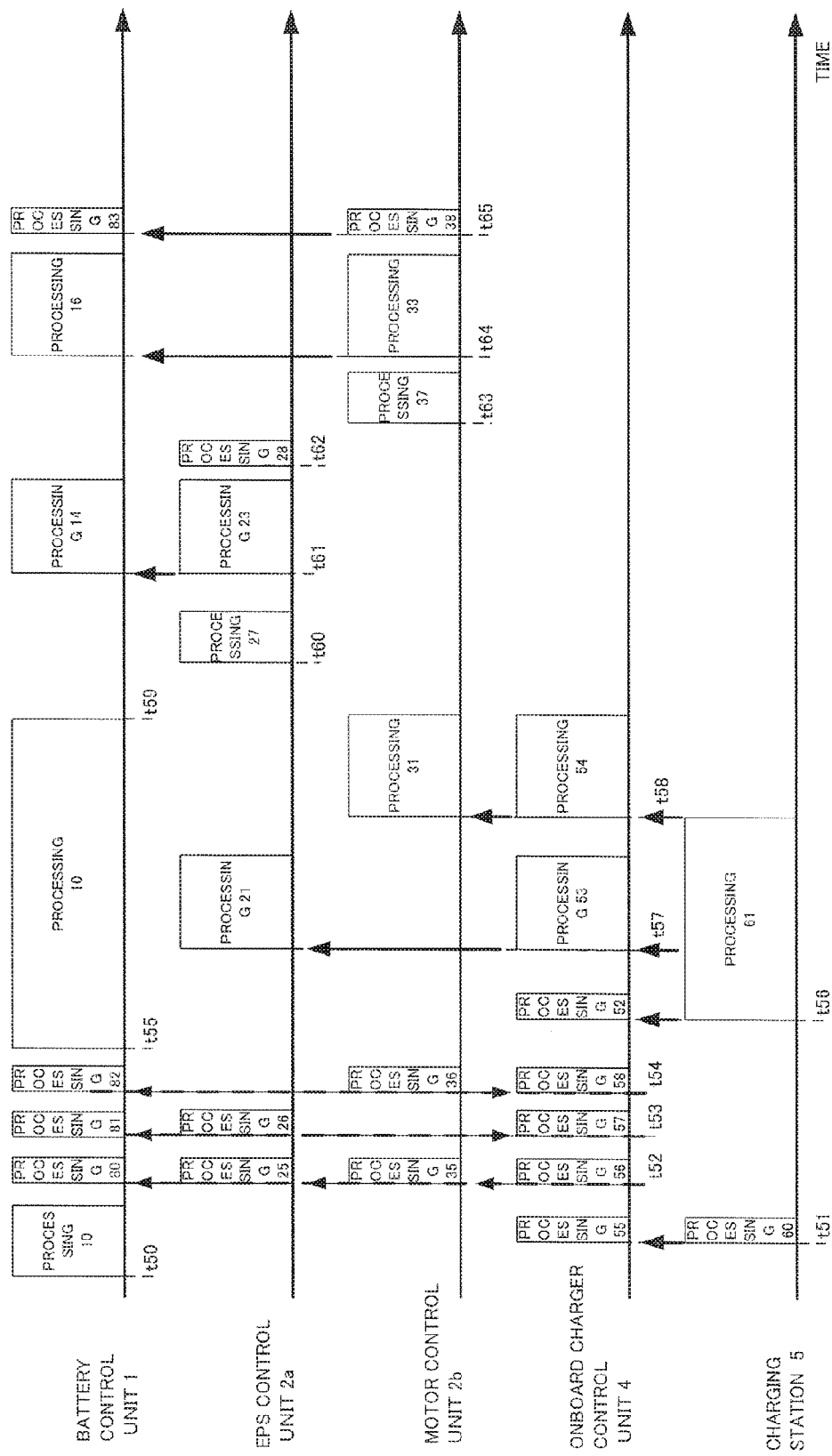
FIG. 15 is a diagram for illustrating along time axis the flows of processing procedures at respective nodes in the program rewriting system according to the third embodiment of the present invention.
Figure 16A:
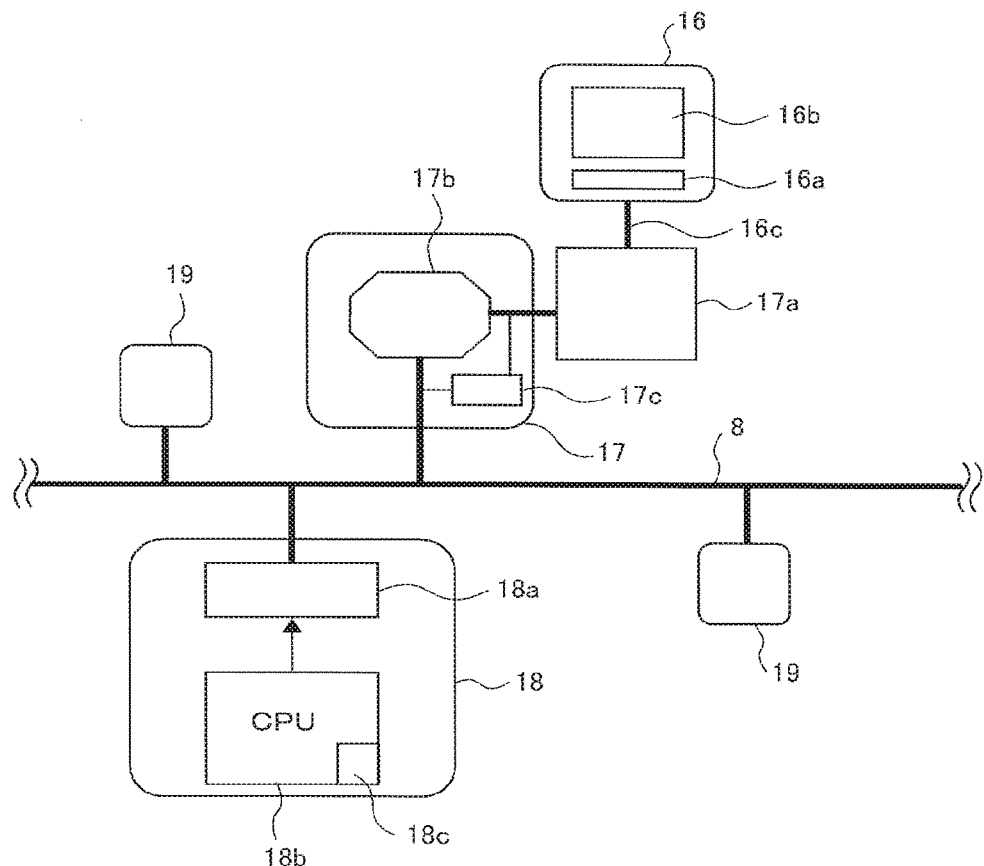
FIG. 16A and FIG. 16B are block diagrams for illustrating a program rewriting system of the related art, and the overall system is illustrated in FIG. 16A while a first control unit included in the system is illustrated in FIG. 16B.
Figure 16B:
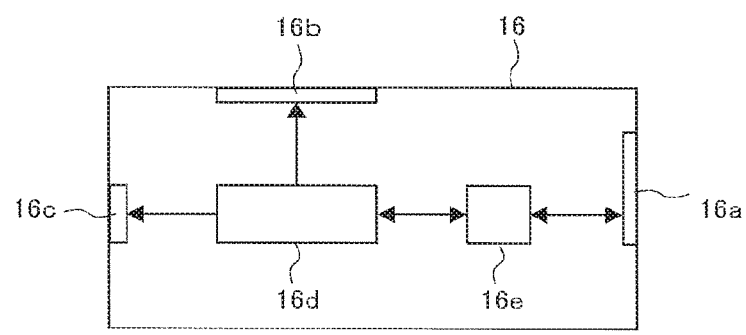

The flows of processing procedures related to program rewriting that are executed at the respective nodes have now been described with reference to the flow charts of FIG. 8, FIG. 10, FIG. 13, and FIG. 14. Next, all the flows of processing procedures at the nodes will be described with reference to a time chart of FIG. 15. In FIG. 15, the vertical axis represents the respective nodes and the horizontal axis represents time.

The charging station 5 and the onboard charger control unit 4 are already connected to the power line communication 7a via the onboard charger 40 in FIG. 15. The EPS control unit 2a and the motor control unit 2b are not executing their respective normal processing procedures in FIG. 15.

At t50, the battery control unit 1 is executing the control of the battery 10 which is normal processing (processing 10). At t51, the charging station 5 uses the power line communication transceiving part 52 to notify via the power line communication 7a the onboard charger control unit 4 that the battery control program of the battery control unit 1 is to be rewritten (processing 60). The onboard charger control unit 4 receives over the power line communication 7a the notification that the rewriting of the battery control program is to be executed (processing 55).

At t52, the onboard charger control unit 4 notifies the battery control unit 1, the EPS control unit 2a, and the motor control unit 2b that the rewriting of the battery control program is to be executed (processing 56). The battery control unit 1, the EPS control unit 2a, and the motor control unit 2b separately receive the notification of the execution of rewriting (processing 80, processing 25, and processing 35).

At t53, the EPS control unit 2a uses the type 1 node state detecting part 25a to determine whether or not the battery control unit 1 is in a state where program rewriting is executable. The battery control unit 1 is executing the normal processing (processing 10) at this point. The type 1 node state detecting part 25a accordingly determines that program rewriting is inexecutable, and notifies the battery control unit 1 and the onboard charger control unit 4 that the divisional rewriting is to be executed because program rewriting is inexecutable (processing 20). The battery control unit 1 and the onboard charger control unit 4 separately receive the notification of the execution of divisional rewriting (processing 81 and processing 57).

At t54, the motor control unit 2b uses the type 1 node state detecting part 25b to determine whether or not the battery control unit 1 is in a state where program rewriting is executable. The battery control unit 1 is executing the normal processing at this point. The type 1 node state detecting part 25b accordingly determines that program rewriting is inexecutable, and notifies the battery control unit 1 and the onboard charger control unit 4 that the divisional rewriting is to be executed because program rewriting is inexecutable (processing 36). The battery control unit 1 and the onboard charger control unit 4 separately receive the notification of the execution of divisional rewriting (processing 82 and processing 58).

At t55, the battery control unit 1 resumes the normal processing (processing 10). At t56, the charging station 5 starts transmitting over the power line communication 7a the rewriting program that is stored in the charging station 5 to the onboard charger control unit 4 (processing 61). The onboard charger control unit 4 stores received parts of the rewriting program in the battery control program temporarily recording area 433 at appropriate timing (processing 52).

At t57, in the case where the received parts of the rewriting program exceed a predetermined amount, the onboard charger control unit 4 uses the program dividing part 44 to create a divisional program A by dividing the rewriting program that is stored in the battery control program temporarily recording area 433 in a manner that allows a partial overlap in data (the overlapping part is a divisional program C) between the divisional program A and another divisional program (a divisional program B). The data transceiving part 42 transmits the created divisional program A to the EPS control unit 2a (processing 53). The EPS control unit 2a stores the received divisional program A in the divisional battery control program recording area 233a (processing 21).

When the received parts of the rewriting program exceed the predetermined amount again, the onboard charger control unit 4 uses the program dividing part 44 at t58 to create the divisional program B by dividing the rewriting program that is recorded in the battery control program temporarily recording area 433 in a manner that allows a partial overlap in data (the overlapping part is the divisional program C as illustrated in FIG. 17) between the divisional program B and another divisional program (the divisional program A). The data transceiving part 42 transmits the created divisional program B to the motor control unit 2b (processing 54). The motor control unit 2b stores the received divisional program B in the divisional battery control program recording area 233b (processing 31).

When all parts of the rewriting program have been received by the onboard charger control unit 4, the charging station 5 ends its own processing related to program rewriting. From then on, the charging station 5 does not need to be connected to the onboard charger 40, and can be disconnected even when program rewriting is being executed in the battery control unit 1.

The battery control unit 1 finishes the normal processing at t59. At t60, the type 1 node state detecting part 25a of the EPS control unit 2a determines whether or not the battery control unit 1 is in a state where the program can be rewritten. The battery control unit 1 is not executing the normal processing at this point, and the type 1 node state detecting part 25a accordingly determines that program rewriting is executable. The type 1 node state detecting part 25a next determines whether or not the battery control program is being rewritten. It is determined that the rewriting is not being executed (processing 27) at this point.

At t61, the transmittability determining part 24a of the EPS control unit 2a determines to transmit a divisional program to the battery control unit 1, and the data transceiving part 22a sequentially transmits the divisional program A stored in the divisional battery control program recording area 233a of the recording device 23a (processing 23). Meanwhile, the battery control unit 1 receives the divisional program A and determines whether or not a part of the battery control program that corresponds to the received divisional program A has already been rewritten. The corresponding part has not been rewritten at this point, and the program rewriting part 14 accordingly rewrites the part of the battery control program that corresponds to the divisional program A. The part of the battery control program that corresponds to the divisional program A and that has not been rewritten is rewritten sequentially because the divisional program A is received sequentially (processing 14).

At t62, the type 1 node state detecting part 25a of the EPS control unit 2a determines whether or not all parts of the battery control program in the battery control unit 1 have been rewritten. Not all of the parts have been rewritten at this point, and the EPS control unit 2a accordingly ends its own processing related to program rewriting (processing 28).

At t63, the type 1 node state detecting part 25b of the motor control unit 2b determines whether or not the battery control unit 1 is in a state where the program can be rewritten. The battery control unit 1 is not executing the normal processing at this point, and the type 1 node state detecting part 25b accordingly determines that program rewriting is executable. The type 1 node state detecting part 25b next determines whether or not the battery control program is being rewritten. It is determined that the rewriting is not being executed (processing 37) at this point.

At t64, the transmittability determining part 24b of the motor control unit 2b determines to transmit a divisional program to the battery control unit 1, and the data transceiving part 22b sequentially transmits the divisional program B stored in the divisional battery control program recording area 233b of the recording device 23b (processing 33).

Meanwhile, the battery control unit 1 receives the divisional program B and determines whether or not a part of the battery control program that corresponds to the received divisional program B has already been rewritten. The part corresponding to the divisional program C has already been rewritten at this point. The program rewriting part 14 accordingly rewrites a part of the battery control program that corresponds to the received divisional program B minus the divisional program C. For the part that corresponds to the divisional program C, the program verification part 9 performs verification about whether or not the data that has already been rewritten matches the data of the received divisional program C (processing 16). It is assumed that the result of the verification reveals no problem. If a problem (inconsistency with the data that has been rewritten) is found at the verification stage, all steps of the rewriting processing are ended.

At t65, the type 1 node state detecting part 25b of the motor control unit 2b determines whether or not all parts of the battery control program have been rewritten. All of the parts have been rewritten at this point, and the data transceiving part 22b accordingly sends to the battery control unit 1 a notification that the program rewriting is completed. The motor control unit 2b then ends its processing related to program rewriting (processing 38). Receiving the notification, the battery control unit 1 determines that the rewriting has been finished for all parts of the battery control program, and ends its own processing related to program rewriting (processing 83).

As described above, with the program rewriting method (system) according to the third embodiment, program rewriting and verification can be executed efficiently as in the second embodiment. In addition, a situation in which the cost of one node is exceedingly higher than the cost of other nodes can be avoided, and the overall cost is kept low as a result.

In the second embodiment and the third embodiment, the onboard charger control unit 4 may include an encryption part for encrypting divisional programs so that divisional programs encrypted by the encryption part are transmitted to and stored in the EPS control unit 2a and the motor control unit 2b. Alternatively, the EPS control unit 2a and the motor control unit 2b may each include an encryption part to encrypt divisional programs received from the onboard charger control unit 4 before the divisional programs are stored.

The battery control unit 1 may include a decryption part for decrypting a divisional program that has been encrypted by an encryption part so that an encrypted divisional program received from the EPS control unit 2a or the motor control unit 2b is decrypted by the decryption part. Alternatively, the EPS control unit 2a and the motor control unit 2b may each include a decryption part to decrypt encrypted divisional programs stored in the EPS control unit 2a and the motor control unit 2b before the divisional programs are transmitted to the battery control unit 1. In short, each type 2 node may include an encryption part and a decryption part.

Including the encryption part and decryption part described above reduces the risk of divisional programs being deciphered by the third party over the CAN network 6, or the risk of divisional programs being deciphered by the third party when the divisional programs are stored in the EPS control unit 2a and the motor control unit 2b, thereby ensuring the security of program rewriting.

While the first embodiment to the third embodiment take as an example a vehicle control system that includes two type 2 nodes, the number of type 2 nodes is not limited thereto. By increasing the number of type 2 nodes, the capacity of each divisional program can be reduced and the recording capacity that is needed in each type 2 node can be kept small. If an odd number of divisional programs that partially overlap with one another in data are created and stored in three or more type 2 nodes that are included in the vehicle control system, the rule of majority can be used as a verification method. When there is data inconsistency between divisional programs, rewrite can be completed despite the problem found in verification in the middle of rewriting, by correcting "wrong" data with divisional program data that is the majority and is therefore deemed as correct data.

While the description given above takes as an example a case in which the CAN network 6 is the first network and the power line communication 7a is the second network, the types of networks included in the system are not limited thereto.

The premise of the first embodiment to the third embodiment is that the program in the type 1 node is successfully rewritten. In anticipation for a failure in rewriting due to a problem found in verification, or some other factors, a timeout time or the like may be set to the type 1 node so that, in the case where a given length of time elapses without receiving a divisional program or before the rewriting is finished, rewrite processing is ended forcibly. However, when the type 1 node is configured to end rewriting in the middle of the execution of rewriting, countermeasures such as preparing another control program that can be run, and recording codes that uniquely indicate failure situations in advance in relevant nodes, need to be taken.

The present invention is applicable as a method of rewriting a program in a system that includes a plurality of control units connected to a network (for example, a vehicle control system).

What is claimed is:

1. A program rewriting system comprising:
a type 1 node that is a type 1 electronic control unit (ECU) and a plurality of type 2 nodes that are a plurality of type 2 ECUs, the type 1 node and the type 2 nodes being communicably connected with each other via a first network, wherein
the type 1 node comprises:
a first recording area for storing a type 1 program that determines operations of the type 1 node; and
a processor programmed to:
responsive to receiving a divisional program from one of the type 2 nodes:
determine whether any part of the type 1 program stored in the first recording area that has already been rewritten corresponds to any part of the received divisional program; and
in a case that an already-rewritten part of the type 1 program that is stored in the first recording area corresponds to an overlapping part of the received divisional program:
execute rewriting of at least part of the contents of the type 1 program stored in the first recording area that corresponds to the received divisional program, the at least part of the contents of the type 1 program that are rewritten excluding the already-rewritten part, which is excluded from the executed rewriting; and
perform verification on the already-rewritten part to determine if there is a problem by verifying whether or not contents of the already-rewritten part of the type 1 program stored in the first recording area that corresponds to the overlapping part of the received divisional program is identical with contents of the corresponding overlapping part of the received divisional program, and
each of the type 2 nodes comprise: a second recording area for storing one of at least two divisional programs that are each parts of the type 1 rewriting program for rewriting the type 1 program and that each include contents that partially overlap with contents of another one of the at least two divisional programs, the another one of the at least two divisional programs being stored in another one of the type 2 nodes.

2. The program rewriting system according to claim 1, further comprising a type 3 node, which is connected to the first network when necessary, and which is mutually communicable via the first network with the type 1 node and the type 2 nodes, wherein
the processor of the type 1 node is a first processor, and the type 3 node comprises:
a third recording area for storing the type 1 rewriting program; and
a second processor programmed to:
create the at least two divisional programs by dividing the type 1 rewriting program stored in the third recording area so that each of the at least two divisional programs include the contents that are identical with the contents of the another one of the at least two divisional program, and
separately transmit via the first network the created at least two divisional programs to each of the type 2 nodes.

3. The program rewriting system according to claim 2, wherein
the second processor of the type 3 node is further programmed to:
encrypt the at least two divisional programs, and
transmit the encrypted at least two divisional programs to the type 2 nodes separately, and
each of the type 2 nodes stores the received encrypted divisional program in the second recording area.

4. The program rewriting system according to claim 1, further comprising:
a type 4 node, which is mutually communicable via the first network with the type 1 node and the type 2 nodes; and
a type 5 node, which is connected when necessary, to a second network separate from the first network, and which is mutually communicable via the second network with the type 4 node, wherein
the processor of the type 1 node is a first processor;
the type 5 node comprises a fifth recording area for storing the type 1 rewriting program, and transmits over the second network the type 1 rewriting program stored in the fifth recording area to the type 4 node, and the type 4 node comprises:
a fourth recording area for storing the type 1 rewriting program received from the type 5 node; and
a second processor programmed to:
when the type 1 rewriting program stored in the fourth recording area reaches a predetermined amount:
create the at least two divisional programs from the type 1 rewriting program so that each of the at least two divisional programs include the contents that are identical with the contents of the another one of the at least two divisional programs, and
separately transmit via the first network the created at least two divisional programs to the type 2 nodes.

5. The program rewriting system according to claim 4, wherein
the second processor of the type 4 node is further programmed to:
detect whether or not the type 1 node is in a state where the type 1 program is rewritable, and
when the type 1 node is detected to be in the state where the type 1 program is rewritable, notify the type 2 nodes via the first network that the type 1 node is in the state where the type 1 program is rewritable, and
when one of the type 2 nodes has received the notification from the second processor, the one of the type 2 nodes transmits the divisional program stored by the one of the type 2 nodes to the type 1 node.

6. The program rewriting system according to claim 4, wherein
the second processor of the type 4 node is further programmed to:
encrypt the at least two divisional programs, and
transmit the at least two encrypted divisional programs to each of the type 2 nodes separately, and
each of the type 2 nodes stores the received encrypted divisional program in the second recording area.

7. The program rewriting system according to claim 1, wherein
the processor is further programmed to:
detect whether or not the type 1 node is in a state where the type 1 program is rewritable, and
when the type 1 node is detected to be in the state where the type 1 program is rewritable, notify to the type 2 nodes via the first network that the type 1 program is rewritable, and
when one of the type 2 nodes has received the notification from the processor, the one of the type 2 nodes transmits the divisional program stored by the one of the type 2 nodes to the type 1 node.

8. The program rewriting system according to claim 1, wherein each of the type 2 nodes:
detects whether or not the type 1 node is in a state where the type 1 program is rewritable, and
when the type 1 node is detected to be in the state where the type 1 program is rewritable, transmits the one of the at least two divisional programs stored by the respective type 2 node to the type 1 node.

9. The program rewriting system according to claim 1, wherein
the type 2nodes include at least three type 2 nodes, the number of type 2 nodes being an odd number, the at least two divisional programs is an odd number of divisional programs that each include contents that partially overlap with contents of a different one of the odd number of divisional programs, and
the processor of the type 1 node is further programmed to:
verify normality of the odd number of divisional programs with a rule of majority.

10. The program rewriting system according to claim 9, wherein, when the contents of overlapping parts of the odd number of divisional programs are inconsistent with each other, the processor of the type 1 node corrects the contents of the divisional program or programs having a minority of contents to the contents of the divisional programs having a majority of contents.

11. The program rewriting system according to claim 1, wherein each of the type 2 nodes encrypts the one of the at least two divisional programs, and stores the encrypted one of the at least two divisional programs in the second recording area.

12. The program rewriting system according to claim 1, wherein the processor of the type 1 node is further programmed to: responsive to receiving an encrypted divisional program from any of the type 2 nodes, decrypt the received encrypted divisional program.

13. The program rewriting system according to claim 1, wherein each of the type 2 nodes decrypts an encrypted divisional program stored in the second recording area, and transmits the decrypted divisional program to the type 1 node.

14. The program rewriting system according to claim 1, wherein each of the type 2 nodes:
determines whether or not the one of the at least two divisional programs stored by the respective type 2 node is transmittable, and
when the one of the at least two divisional programs stored by the type 2 node is determined to be transmittable, transmits the one of the at least two divisional programs stored by the type 2 node to the type 1 node via the first network.

15. A program rewriting method for rewriting a type 1 program for determining operation of a type 1 node that is a type 1 electronic control unit (ECU) in a system comprising the type 1 node and a plurality of type 2 nodes that are a plurality of type 2 ECUs, the type 1 node and the type 2 nodes being communicably connected with each other via a first network, the program rewriting method comprising:
storing, by each of the type 2 nodes, one of at least two divisional programs that each include parts of a type 1 rewriting program for rewriting the type 1 program and that each include contents that partially overlap with contents of another one of the at least two divisional programs;
transmitting, by each of the type 2 nodes, via the first network, the respective one of the at least two divisional programs stored in the type 2 node to the type 1 node: and
responsive to receiving a divisional program from one of the type 2 nodes:
determining, by the type 1 node, whether any part of the type 1 program stored in the first recording area that has already been rewritten corresponds to any part of the received divisional program; and
in a case that an already-rewritten part of the type 1 program that is stored in the first recording area corresponds to an overlapping part of the received divisional program:

executing rewriting, by the type 1 node, of at least part of the contents of the type 1 program stored in the first recording area that corresponds to the received divisional program, the at least part of the contents of the type 1 program that are rewritten excluding the already-rewritten part, which is excluded from the executed rewriting; and performing verification, by the type 1 node, on the already-rewritten part to determine if there is a problem by verifying whether or not contents of the already-rewritten part of the type 1 program stored in the first recording area that corresponds to the overlapping part of the received divisional program is identical with contents of the corresponding overlapping part of the received divisional program.

16. The program rewriting method according to claim 15, wherein
the system further comprises a type 3 node, which is connected to the first network when necessary, and which is communicable via the first network to the type 1 node and the type 2 nodes, and
the type 3 node creates the at least two divisional programs by dividing the type 1 rewriting program so that each of the at least two divisional programs include the contents that are identical with the contents of the another one of the at least two divisional programs, and separately transmits via the first network the created at least two divisional programs to each of the type 2 nodes.

17. The program rewriting method according to claim 15, wherein
the system further comprises:
a type 4 node, which is communicable via the first network to the type 1 node and the type 2 nodes; and
a type 5 node, which is connected when necessary, to a second network separate from the first network, and which is communicable over the second network to the type 4 node,
the type 5 node which stores the type 1 rewriting program transmits the stored type 1 rewriting program over the second network to the type 4 node, and
when the type 1 rewriting program stored in a recording area of the type 4 node reaches a predetermined amount, the type 4 node creates the at least two divisional programs from the type 1 rewriting program so that each of the at least two divisional programs include the contents that are identical with the contents of the another one of the at least two divisional programs, and separately transmits via the first network the created at least two divisional programs to the type 2 nodes.

18. The program rewriting method according to claim 17, wherein
the type 4 node detects whether or not the type 1 node is in a state where the type 1 program is rewritable, and when the type 1 node is detected to be in the state where the type 1 program is rewritable, notifies the type 2 nodes via the first network that the type 1 node is in the state where the type 1 program is rewritable, and
when one of the type 2 nodes has received the notification from the second processor, the one of the type 2 node transmits the divisional program stored by the one of the type 2 nodes to the type 1 node.

19. The program rewriting method according to claim 15, wherein
the type 1 node detects whether or not the type 1 node is in a state where the type 1 program is rewritable, and when the type 1 node is detected to be in the state where the type 1 program is rewritable, notify to the type 2 nodes via the first network that the type 1 program is rewritable, and
when one of the type 2 nodes has received the notification from the processor, the one of the type 2 nodes transmits the divisional program stored by the one of the type 2 nodes to the type 1 node.

20. The program rewriting method according to claim 15, wherein each of the type 2 nodes: detects whether or not type 1 node is in a state where the type 1 program is rewritable, and when the type 1 node is detected to be in the state where the type 1 program is rewritable, transmits the one of the at least two divisional programs stored by the respective type 2 node to the type 1 node.

21. The program rewriting method according to claim 15, wherein
the type 2 nodes include at least three type 2 nodes, the number of type 2 nodes being an odd number,
the at least two divisional programs is an odd number of divisional programs that each include contents that partially overlap with contents of a different one of the odd number of divisional programs, and
the type 1 node verifies normality of the odd number of divisional programs with a rule of majority.

* * * * *